United States Patent
Roddy et al.

(10) Patent No.: US 6,769,772 B2
(45) Date of Patent: Aug. 3, 2004

(54) SIX COLOR DISPLAY APPARATUS HAVING INCREASED COLOR GAMUT

(75) Inventors: James E. Roddy, Rochester, NY (US); Robert J. Zolla, Rochester, NY (US); Nelson A. Blish, Rochester, NY (US); Louis S. Horvath, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/269,314

(22) Filed: Oct. 11, 2002

(65) Prior Publication Data

US 2004/0070736 A1 Apr. 15, 2004

(51) Int. Cl.[7] .......................... G03B 21/00; G03B 21/26
(52) U.S. Cl. .............................. 353/31; 353/94
(58) Field of Search ................ 353/29–34, 94, 353/48, 7, 8, 81, 84, 85–87, 122; 349/5, 8, 9, 10, 15

(56) References Cited

U.S. PATENT DOCUMENTS

| | | |
|---|---|---|
| 4,441,791 A | 4/1984 | Hornbeck |
| 5,535,047 A | 7/1996 | Hornbeck |
| 5,537,258 A | 7/1996 | Yamazaki et al. |
| 5,570,213 A | 10/1996 | Ruiz et al. |
| 5,600,383 A | 2/1997 | Hornbeck |
| 5,612,753 A | 3/1997 | Poradish et al. |
| 5,620,755 A | 4/1997 | Smith, Jr. et al. |
| 5,719,695 A | 2/1998 | Heimbuch |
| 5,795,047 A | 8/1998 | Sannohe et al. |
| 5,828,424 A | 10/1998 | Wallenstein |
| 5,905,545 A | 5/1999 | Poradish et al. |
| 5,914,818 A | 6/1999 | Tejada et al. |
| 5,921,650 A | 7/1999 | Doany et al. |
| 5,930,050 A | 7/1999 | Dewald |
| 5,982,992 A | 11/1999 | Waldron |
| 5,984,478 A * | 11/1999 | Doany et al. ............. 353/84 |
| 5,993,004 A * | 11/1999 | Moseley et al. .......... 353/8 |
| 6,008,951 A | 12/1999 | Anderson |
| 6,020,937 A | 2/2000 | Bardmesser |
| 6,089,717 A | 7/2000 | Iwai |
| 6,147,720 A | 11/2000 | Guerinot et al. |
| 6,191,826 B1 | 2/2001 | Murakami et al. |
| 6,203,160 B1 | 3/2001 | Ho |
| 6,217,174 B1 | 4/2001 | Knox |
| 6,220,710 B1 | 4/2001 | Raj et al. |
| 6,247,816 B1 | 6/2001 | Cipolla et al. |
| 6,256,073 B1 | 7/2001 | Pettitt |
| 6,280,034 B1 | 8/2001 | Brennesholtz |
| 6,283,597 B1 * | 9/2001 | Jorke ....................... 353/31 |
| 6,511,183 B2 * | 1/2003 | Shimizu et al. .......... 353/20 |
| 6,612,702 B1 * | 9/2003 | Ushiyama et al. ....... 353/31 |
| 6,637,886 B2 * | 10/2003 | Ushiyama et al. ....... 353/20 |
| 6,654,171 B1 * | 11/2003 | Hampel-Vogedes ..... 359/618 |

FOREIGN PATENT DOCUMENTS

| | | |
|---|---|---|
| EP | 586139 B1 | 5/1998 |
| WO | 01/95544 A2 | 12/2001 |

OTHER PUBLICATIONS

R. Berns; Priciples of Color Technology, Third Edition; pp. 59–65.

R. W. G. Hunt; The Reproduction of Colour; pp. 106–135.

\* cited by examiner

*Primary Examiner*—Andrew T. Sever
(74) *Attorney, Agent, or Firm*—Nelson Adrian Blish

(57) ABSTRACT

A display system (10) for digital color images using six color light sources (12) or two or more multicolor LED arrays (212, 213) or OLEDs (220, 222) to provide an expanded color gamut. Apparatus (10) uses two or more spatial light modulators (20, 21), which may be cycled between two or more color light sources (12) or LED arrays (212, 213) to provide a six-color display output. Pairing of modulated colors using relative luminance helps to minimize flicker effects.

17 Claims, 15 Drawing Sheets

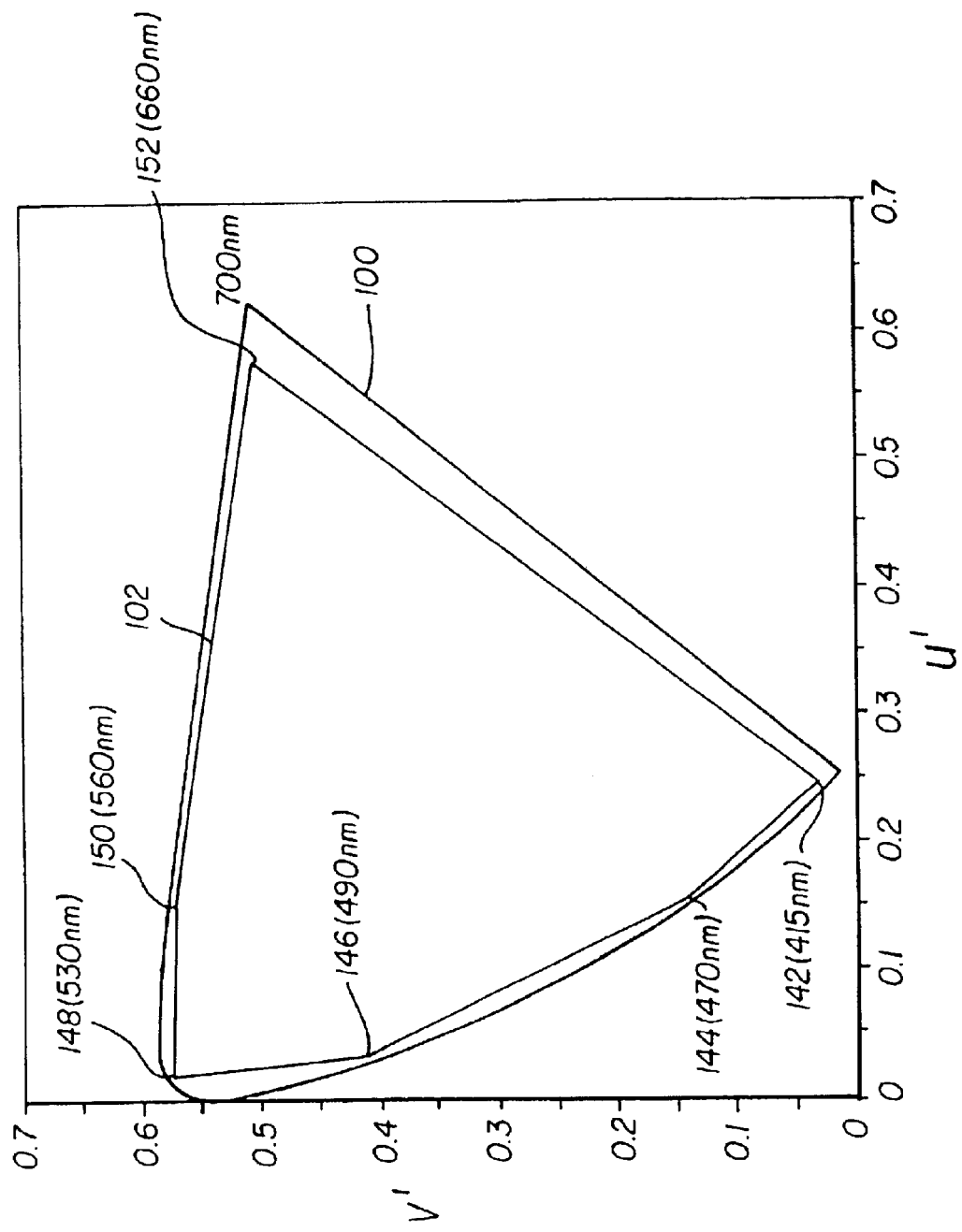

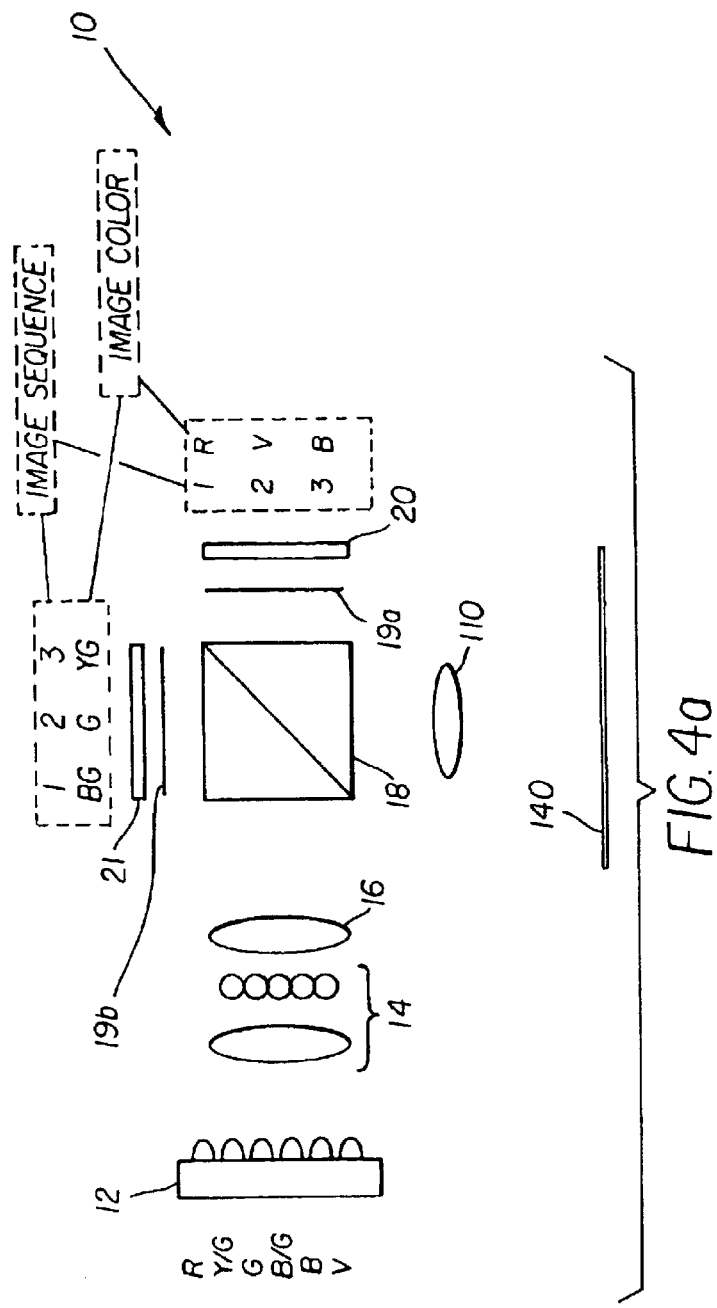
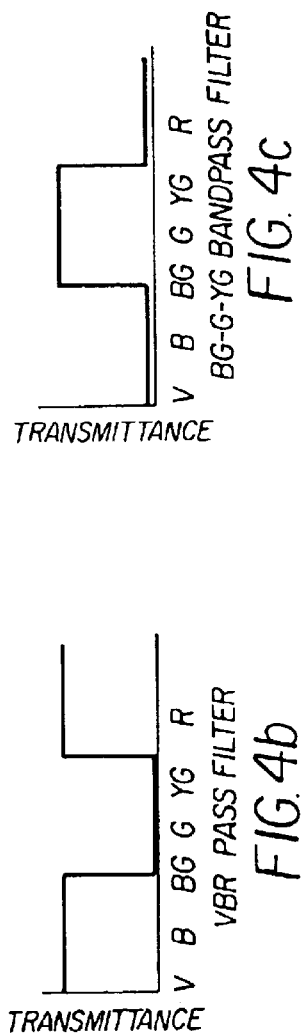

DICHROIC REFLECTION
CHARACTERISTIC

X-CUBE "RED" SPECTRAL REFLECTANCE

X-CUBE "GREEN" SPECTRAL TRANSMITTANCE

X-CUBE "BLUE" SPECTRAL REFLECTANCE

SIX COLOR DISPLAY APPARATUS HAVING INCREASED COLOR GAMUT

CROSS REFERENCE TO RELATED APPLICATIONS

Reference is made to commonly-assigned copending application U.S. patent application Ser. No. 10/177,513, filed Jun. 21, 2002, entitled IMAGING APPARATUS FOR INCREASED COLOR GAMUT USING DUAL SPATIAL LIGHT MODULATORS, by Horvath et al., the disclosure of which is incorporated herein.

FIELD OF THE INVENTION

This invention generally relates to a display apparatus for forming color images from digital data onto a surface and more particularly relates to a wide-gamut display apparatus having two or more spatial light modulators, each spatial light modulator temporally shared between two or more light sources.

BACKGROUND OF THE INVENTION

A number of different color spaces have been used to describe the human visual system. In one attempt to define a workable color space, Commission Internationale de l'Eclairage (International Commission on Illumination) developed the CIE Chromaticity Diagram, first published in 1931. The CIE color model employed the tristimulus values X,Y,Z based on a standard human observer. In later work, the CIE Chromaticity Diagram in X, Y, and Z was modified to a u' and v' diagram in which equal distances on the diagram represent equal perceived color shifts. Useful background discussion of the CIE Chromaticity Diagram and of color perception and color models in general can be found in Billmeyer and Saltzmann's *Principles of Color Technology*, Third Edition, Wiley and Sons, and in chapter 7 of Dr. R. W. G. Hunt's *The Reproduction of Color*, Fifth Edition, Fountain Press, England.

FIG. 1 shows a familiar color gamut representation using CIE 1976 L*u*v* conventions, with the perceived eye-brain color gamut in u'-v' coordinate space represented as a visible gamut 100. Pure, saturated spectral colors are mapped to the "horseshoe" shaped periphery of the visible gamut 100 curve. The interior of the "horseshoe" contains all mappings of mixtures of colors, such as spectral red with added blue, which becomes magenta, for example. The interior of the horseshoe can also contain mixtures of pure colors with white, such as spectral red with added white, which becomes pink, for example. The overall color area defined by the "horseshoe" curve of visible gamut 100 is the full range of color that the human visual system can perceive. It is desirable to represent as much as possible of this area in a color display to come as close as possible to representing the original scene as it would be perceived by a human observer.

Conventional motion picture display, whether for large-scale commercial color projection from film or for color television CRTs, operates within a fairly well-established color gamut. Referring again to the mapping of FIG. 1, observe that visible gamut 100 shows the full extent of human-perceivable color that, in theory, could be represented for motion picture display. A more restricted motion picture film gamut 102 is mapped out within visible gamut 100, showing the reduced extent of color representation achievable with conventional film media. A further restricted NTSC TV gamut 104 shows the limitations placed on achievable colors using conventional color CRT phosphors.

It is instructive to note that, because the colors of the CRT phosphors for NTSC TV gamut 104 are not typically saturated, the points defining the color of each phosphor do not lie on the periphery of visible gamut 100. Hence, for example, colors such as turquoise and neon orange can be perceived by the eye in the actual scene but are beyond the color capability of a CRT phosphor system. As is clear from FIG. 1, the range of colors that can be represented using conventional film or TV media falls far short of the full perceivable range of visible gamut 100.

Conventionally, the component colors used for motion picture film employ red, green and blue dyes (or their complementary counterparts cyan, magenta and yellow) as primary colors. Component colors for color television CRTs employ red, green, and blue phosphors. These dyes and phosphors, initially limited in the colors that they could represent, have been steadily improved. However, as is clear from the gamut mapping represented in FIG. 1, there is still considerable room for improvement in approximating visible gamut 100 in both motion picture and TV environments.

With the advent of digital technology and the demonstration of fully digital projection systems, there is renewed interest in increasing the range or gamut of colors that can be displayed in order to provide a more realistic, more vivid image than is possible with the gamut limitations of film dyes or phosphors. The most promising solutions for digital cinema projection employ, as image forming devices, one of two types of spatial light modulators (SLMs). A spatial light modulator can be considered essentially as a two-dimensional array of light-valve elements, each element corresponding to an image pixel. Each array element is separately addressable and digitally controlled to modulate transmitted or reflected light from a light source. There are two salient types of spatial light modulators that are being employed for forming images in projection and printing apparatus: digital micromirror devices (DMDs) and liquid crystal devices (LCDs).

Texas Instruments has demonstrated prototype projectors using one or more DMDs. DMD devices are described in a number of patents, for example U.S. Pat. Nos. 4,441,791; 5,535,047; 5,600,383 (all to Hornbeck); and U.S. Pat. No. 5,719,695 (Heimbuch). Optical designs for projection apparatus employing DMDs are disclosed in U.S. Pat. No. 5,914,818 (Tejada et al.); U.S. Pat. No. 5,930,050 (Dewald); U.S. Pat. No. 6,008,951(Anderson); and U.S. Pat. No. 6,089,717 (Iwai). LCD devices are described, in part, in U.S. Pat. No. 5,570,213 (Ruiz et al.) and U.S. Pat. No. 5,620,755 (Smith, Jr. et al.).

While there has been some success in color representation using spatial light modulators, there is a long-felt need for a further broadening of the projection color gamut that will enhance special effects and heighten the viewing experience for an audience.

Faced with a similar problem of insufficient color gamut, the printing industry has used a number of strategies for broadening the relatively narrow gamut of pigments used in process-color printing. Because conventional color printing uses light reflected from essentially white paper, the color representation methods for print employ a subtractive color system. Conventionally, the process colors cyan (blue+green), magenta (red+blue) and yellow (red+green) are used for representing a broad range of colors. However, due to the lack of spectral purity of the pigment, combinations of cyan, magenta and yellow are unable to yield black, but instead provide a dark brown hue. To improve the appearance of shadow areas, black is added as a fourth pigment. As is well known in the printing arts, further refined techniques, such as undercolor removal, can then be used to take advantage of less expensive black pigments in full-color synthesis. Hence, today's conventional color printing uses the four color CMYK (Cyan, Magenta, Yellow, and blacK) method described above.

However, even with the addition of black, the range of colors that can be represented by printing pigments is limited. There are specialized colors that cannot be adequately reproduced using the CMYK "process color" system, such as metallic gold or silver, or specific colors such as those used for corporate identity in logos and packaging, for example. To meet this need, a fifth pigment can be added to a selected print run in order to provide "spot color" over specific areas of an image. Using this technique, for example, many companies use special color inks linked to a product or corporate identity and use these colors in packaging, advertising, logos, and the like, so that the consumer recognizes a specific product, in part, by this special color.

Colors in addition to the conventional CMYK process color set have been employed to extend the overall color gamut in printing applications. For example, EP 0 586 139 (Litvak) discloses a method for expanding the conventional color gamut that uses the 4-color CMYK space to a color space using five or more colors.

Referring back to FIG. 1, it is instructive to note that the color gamut is essentially defined by a polygon, where each vertex corresponds to a substantially pure, saturated color source used as a component color. The area of the polygon corresponds to the size of the color gamut. To expand the color gamut requires moving one or more of these vertices closer to the outline of visible gamut 100. Thus, for example, addition of a color that is inside the polygon defining the color gamut does not expand the color gamut. For example, U.S. Pat. No. 5,982,992 (Waldron) discloses using an added "intra-gamut" colorant in a printing application. However, as noted in the specification of U.S. Pat. No. 5,982,992, this method does not expand the color gamut itself, but can be used for other purposes, such as to provide improved representation of pastels or other colors that are otherwise within the gamut but may be difficult to represent using conventional colorants.

Conventional color models, such as the CIE LUV model noted above, represent each individual color as a point in a 3-dimensional color space, typically using three independent characteristics such as hue, saturation, and brightness. Color data, such as conventional image data for a pixel displayed on a color CRT, is typically expressed with 3-color components (for example R, G, B). Conventional color projection film provides images using three photosensitized emulsion layers, sensitive to red, blue, and green illumination. Because of these conventional practices and image representation formats, developers of digital projection systems have, understandably, adhered to a 3-color model. In conformance with conventional 3-color practices and data representation methods, developers of digital projection apparatus have proposed various solutions for illumination systems, such as filtering a bright white light source to obtain red, green, and blue component colors for full color image projection. As just one example, U.S. Pat. No. 6,247,816 (Cipolla et al.) discloses a digital projection system employing dichroic optics to split white light into suitable red, green, and blue color components for modulation.

A few projection solutions have been proposed using more than 3-color light sources. However, the bulk of solutions proposed have not targeted color gamut expansion. Disclosures of projectors using more than 3-color sources include the following:

U.S. Pat. No. 6,256,073 (Pettit) discloses a projection apparatus using a filter wheel arrangement that provides four colors in order to maintain brightness and white point purity. However, the fourth color added in this configuration is not spectrally pure, but is white in order to add brightness to the display and to minimize any objectionable color tint. It must be noted that white is analogous to the "intra-gamut" color addition noted in the printing application of U.S. Pat. No. 5,982,992. As is well known to those skilled in color theory, adding white actually reduces the color gamut.

Similarly, U.S. Pat. No. 6,220,710 (Raj et al.) discloses the addition of a white light channel to standard R, G, B light channels in a projection apparatus. As was just noted, the addition of white light may provide added luminosity and may help to achieve some intra-gamut colors more easily, but this type of solution constricts the color gamut.

U.S. Pat. No. 6,191,826 (Murakami et al.) discloses a projector apparatus that uses four colors derived from a single white light source, where the addition of a fourth color, orange, compensates for unwanted effects of spectral distribution that affect the primary green color path. In the apparatus of U.S. Pat. No. 6,191,826, the specific white light source used happens to contain a distinctive orange spectral component. To compensate for this, filtering is used to attenuate undesirable orange spectral content from the green light component in order to improve the spectral purity of the green illumination. Then, with the motive of compensating for the resulting loss of brightness, a separate orange light is added as a fourth color. The disclosure indicates that some expansion of color range is experienced as a side effect. However, with respect to color gamut, it is significant to observe that the solution disclosed in U.S. Pat. No. 6,191,826 does not appreciably expand the color gamut of a projection apparatus. In terms of the color gamut polygon described above with reference to FIG. 1, addition of an orange light may add a fourth vertex, however, any added orange vertex would be very close to the line already formed between red and green vertices. Thus, the newly formed gamut polygon will, at best, exhibit only a very slight increase in area over the triangle formed using three component colors. Moreover, unless a pure wavelength orange is provided, with no appreciable leakage of light having other colors, there could even be a small decrease in color gamut using the methods disclosed in U.S. Pat. No. 6,191,826.

U.S. Pat. No. 6,280,034 (Brennesholtz) discloses a projection apparatus using up to six colors, employing RGB as well as CMY (cyan, magenta, and yellow) colors that are obtained from a broadband light source. Although such an approach may be useful to enhance brightness and luminance for some colors, the addition of complementary CMY colors does not expand the color gamut and, in practice, could result in a smaller color gamut, as indicated in the disclosure of U.S. Pat. No. 6,280,034. Additionally, the embodiment disclosed in U.S. Pat. No. 6,280,034 uses light sources having different polarizations, which prevents use of an analyzer for improving contrast.

In contrast to the above patent disclosures, U.S. Pat. No. 6,147,720 (Guerinot et al.) discloses a projection system that claims a broadened color gamut by employing six colors. The apparatus disclosed in U.S. Pat. No. 6,147,720 uses a rotating filter wheel to generate red, green, blue, cyan, magenta, and yellow source illumination. Each of these six colors, in sequence, is then directed to a single light valve for modulation. While this apparatus may provide some modest increase in color gamut, there are significant disadvantages to the solution proposed in U.S. Pat. No. 6,147,720. For example, brightness is necessarily constrained whenever a filter wheel is used, due to both the selective action of the filter and to inherent timing and dead time constraints. With a primary color and its complementary color alternated, intensity flicker may be a further problem with the embodiment of U.S. Pat. No. 6,147,720. Continued rapid cycling of arc lamps used as white light sources presents another potential problem source with this design. For these reasons, the apparatus design proposed in U.S. Pat. No. 6,147,720 may not meet performance, reliability, and cost requirements for digital projection.

Patent Application WO 01/95544 A2 (Ben-David et al.) discloses a display device and method for color gamut expansion using four or more substantially saturated colors. While the disclosure of application WO 01/95544 provides improved color gamut, however, the embodiments and methods disclosed apply conventional solutions for generating and modulating each color. The solutions disclosed use either an adapted color wheel with a single spatial light modulator or use multiple spatial light modulators, with a spatial light modulator dedicated to each color. When multiplexing a single spatial light modulator to handle more than three colors, a significant concern relates to the timing of display data. The spatial light modulator employed must provide very high-speed refresh performance, with high-speed support components in the data processing path. Parallel processing of image data would very likely be required in order to load pixel data to the spatial light modulator at the rates required for maintaining flicker-free motion picture display. It must also be noted that the settling time for conventional LCD modulators, typically in the range of 10–20 msec for each color, further shortens the available projection time and thus constrains brightness. Moreover, the use of a filter wheel for providing the successive component colors at a sufficiently high rate of speed has further disadvantages. Such a filter wheel must be rotated at very high speeds, requiring a precision control feedback loop in order to maintain precision synchronization with data loading and device modulation timing. The additional "dead time" during filter color transitions, already substantial in devices using 3-color filter wheels, would further reduce brightness and complicate timing synchronization. Coupling the filter wheel with a neutral density filter, also rotating in the light path, introduces additional cost and complexity. Although rotating filter wheels have been adapted for color projection apparatus, the inherent disadvantages of such a mechanical solution are widely acknowledged. Further, without some shuttering means, color crosstalk becomes a problem. Color crosstalk would occur, for example, at a transition of light color while the corresponding data transition is also in process. Alternative solutions using a spatial light modulator dedicated to each color introduce other concerns, including proper alignment for component colors. The disclosure of application WO 01/95544 teaches the deployment of a separate projection system for each color, which would be costly and would require separate alignment procedures for each display screen size and distance. Providing illumination from a single light source results in reduced brightness and contrast. Moreover, the added cost in using four or more spatial light modulators may not justify an incremental improvement in color gamut for consumer projection devices. Thus, while the disclosure of application WO 01/95544 teaches gamut expansion in theory, in practice there are a number of significant drawbacks to the design solutions proposed. As a studied consideration of application WO 01/95544 clearly shows, problems that were difficult to solve for 3-color projection, such as timing synchronization, color alignment, maintaining brightness and contrast, cost of spatial light modulators and overall complexity, are even more challenging when attempting to use four or more component colors.

Thus, it can be seen that, with respect to projection apparatus, there have been solutions using a fourth color, however, few of these solutions target the expansion of the color gamut as a goal or disclose efficient methods for obtaining an expanded color gamut while maintaining the necessary brightness and overall performance required for digital projection or display. In fact, as is shown in a number of the solutions listed above, there can even be some loss of color gamut with the addition of a fourth color. Proposed solutions for expanding color gamut such as those disclosed in the WO 01/95544 application would be difficult and costly to implement.

Referring back to FIG. 1, it is instructive to note that the broadest possible gamut is achieved when component colors, that is, colors represented by the vertices of the color gamut polygon, are spectrally pure colors. In terms of the gamut mapping of FIG. 1, a spectrally pure color would be represented as a single point lying on the boundary of the curve representing visible gamut 100. As is well known in the optical arts, lasers inherently provide light sources that exhibit high spectral purity. For this reason, lasers are considered as suitable light sources for digital color projection. In some conventional designs, laser beams are modulated and combined and then raster scanned using electro-mechanical low-speed vertical and high-speed horizontal scanners. These scanners typically comprise spinning polygons for high speed scanning and galvanometer driven mirrors for low speed deflection. Vector scan devices that write "cartoon character" outlines with two galvanometer scanners have long been on the market for large area outdoor laser displays, for example. Lasers have also been used with spatial light modulators for digital projection. As one example, U.S. Pat. No. 5,537,258 (Yamazaki et al.) discloses a laser projection system with red, green, and blue dye lasers providing the primary colors for forming an image using a single shared spatial light modulator.

There have been proposed solutions using more than three lasers within a projector where the additional laser serves a special purpose other than color projection. For example, U.S. Pat. No. 6,020,937 (Bardmesser) discloses a TV display system using as many as four color lasers, however, the fourth laser provides an additional source for achieving increased scan speed and is not a fourth color source. The use of a fourth pump laser is noted in U.S. Pat. No. 5,537,258 cited above and in U.S. Pat. No. 5,828,424 (Wallenstein), which discloses a color projection system that uses a pump laser source with frequency multipliers to excite projection lasers having the conventional R, G, B colors. Again, this use of a fourth laser does not add a fourth projection color.

Unlike color projection film, digital projection presents a full-color image as a composite of individual component color frames, conventionally as red, green, and blue components. A digital projection apparatus, such as that disclosed in U.S. Pat. No. 5,795,047 (Sannohe et al.) may provide all three component color frames simultaneously. However, this method requires three separate spatial light modulators, one dedicated to each color. As a less expensive alternative, a single spatial light modulator can be shared, providing a sequence of component color frames, multiplexed at a rapid rate, so that the human eye integrates separately displayed color frames into a single color image. When using three colors, this multiplexing method may be capable of providing a color-sequenced image in a series of component color frames that are switched rapidly enough so that color transitions are imperceptible to an observer. However, as was noted above with reference to application WO 01/95544, a four-, five-, or six-color projection apparatus may not be able to provide frame sequencing at a sufficient rate for maintaining flicker-free imaging at needed brightness levels. Moreover, at the same time, the added cost of a fourth, fifth, or sixth spatial light modulator may be prohibitive, preventing manufacturers from taking advantage of the additional color gamut that is available.

There have been a number of solutions proposed for reducing the number of spatial light modulators used in a projection apparatus. Field-sequential or color-sequential operation, widely used for low-end projectors such as those used for business presentations, employs a single spatial light modulator that is temporally shared for each of the primary RGB colors, in multiplexed fashion. However, device response time problems for data loading, setup, and modulation response time limit the usefulness of the field-sequential approach for higher quality devices. Proposed alternatives to alleviate response time constraints include configurations using dual spatial light modulators, as in the following examples:

U.S. Pat. No. 6,203,160 (Ho) discloses a projection apparatus using two spatial light modulators, one for modulating the s-polarization component of incident light, the other for modulating the p-polarization component. With a similar approach, U.S. Pat. No. 5,921,650 (Doany et al.) also discloses a projector using two spatial light modulators, one for light having s-polarization and one for light having p-polarization. While the approaches used in U.S. Pat. Nos. 6,203,160 and 5,921,650 provide some advantages with respect to efficient use of light, this type of approach has some drawbacks. Achieving high contrast when using both s- and p-polarization states can be difficult, requiring additional polarization devices in each light modulation path. Both U.S. Pat. Nos. 6,203,160 and 5,921,650 use a broadband white light and a color filter wheel for providing a color illumination source. This approach adds mechanical cost and complexity and limits the flexibility of the illumination system.

U.S. Pat. No. 6,217,174 (Knox) discloses an image display apparatus using two spatial light modulators, with the first spatial light modulator dedicated to a single primary color and the second spatial light modulator multiplexed between the other two primary colors using a color shutter. This approach reduces the switching speed requirements of apparatus using a single spatial light modulator. However, the apparatus disclosed in U.S. Pat. No. 6,217,174, since it is intended for use within a small display device, is designed for a lamp-based light source. It may prove difficult to obtain the necessary brightness or image quality for a projector apparatus using the approach of U.S. Pat. No. 6,217,174, for example. Furthermore, this device has the gamut limitations of three colors derived from a broadband source.

U.S. Pat. Nos. 5,612,753 and 5,905,545 (Poradish et al.) disclose projection apparatus that employ two spatial light modulators, each within a modulator system that has its own projection lens. For providing source illumination, a color filter wheel is deployed in the path of a broadband light source.

The approach disclosed in U.S. Pat. Nos. 5,612,753 and 5,905,545 alleviates the timing constraints of projection apparatus when compared against approaches using a single spatial light modulator in field sequential fashion. However, the arrangement of components disclosed in these patents is mechanically complex, requires multiple separate projection optics and, because it derives color illumination from a broadband light source, is limited with respect to brightness.

The apparatus disclosed in U.S. Pat. No. 6,280,034 (Brennesholtz) described above utilizes dual spatial light modulators, one for RGB primary colors, the other for CMY complementary colors. As was noted, this approach augments the luminance range available, rather than expanding the color gamut. Moreover, with this arrangement, both spatial light modulators operate in color sequential mode, each shared among three colors in multiplexed fashion. Thus, the arrangement of U.S. Pat. No. 6,280,034 provides no relief for timing problems due to color sequential operation when compared with existing three-color projection solutions.

Thus, although there have been some proposed solutions using two or more spatial light modulators for projection apparatus that use three or more colors, there is room for improvement. Lamps and other broadband light sources set practical limits on brightness levels achievable, particularly where color filter wheels or similar devices that cause some amount of light attenuation or have inherent "dead space" during transitions are employed. The use of color wheels makes it unwieldy to alter or adjust illumination timing. Response times of spatial light modulator devices further constrain the possible timing sequences, particularly where these devices are multiplexed among three colors. In the face of these difficulties, the advantages of expanding the color gamut with an additional color would not be considered within reach using conventional design approaches.

Thus, it can be seen that although conventional approaches for digital projection can be used for a projection or display system using six colors, there is a need for an effective solution that provides the benefits of increased color gamut at reasonable cost, without sacrificing brightness and overall image quality.

SUMMARY OF THE INVENTION

It is an object of the present invention to provide a display apparatus for forming, from digital data, a color image having a broad color gamut. With this object in mind, the present invention provides an apparatus for display of a color image from digital data, the apparatus comprising:

(a) a first modulation system for providing a first modulated beam, the first modulation system comprising:

(a1) a first spatial light modulator for modulating a first incident light beam in order to form the first modulated beam according to the digital data;

(a2) a first light source for providing a first color beam as the first incident light beam;

(a3) a second light source for providing a second color beam as the first incident light beam;

(a4) a third light source for providing a third color beam as said first incident light beam;

(b) a second modulation system for providing a second modulated beam, the second modulation system comprising:

(b1) a second spatial light modulator for modulating a second incident light beam in order to form the second modulated beam according to the digital data;

(b2) a fourth light source for providing a fourth color beam as said second incident light beam;

(b3) a fifth light source for providing a fifth color beam as the second incident light beam;

(b4) a sixth light source for providing a sixth color beam as the second incident light beam; and (c) an optical combiner for directing the first modulated beam and the second modulated beam for projection onto a surface by a projection lens.

A feature of the present invention is the use of light sources having a sufficient degree of spectral purity in order to provide a broad color gamut. LEDs, widely available, inexpensive, nearly monochromatic, and having a long component life, are used in the preferred embodiment. LEDs are inherently small, bright, and low-power devices, with fast switching times. There is no need for splitting or filtering of the LED light when directed toward an LCD spatial light modulator, and no consequent filter losses.

A feature of the present invention is the pairing of spatial light modulators, each alternately modulated by one of two or three colors. This arrangement allows a number of timing sequences to be implemented for optimizing image quality.

It is an advantage of the present invention that it provides an apparatus capable of achieving enhanced color gamut for displaying digital images when compared against conventional 3-color display equipment such as color monitors. The apparatus and method of the present invention allows the display of colors that were not achievable with previous systems.

It is a further advantage of the present invention that it allows optimization of optical and support components for the light modulation path.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 2a and 2b are graphs showing expanded color gamut using the method of the present invention;

FIG. 4a is a schematic block diagram showing a six-color display system using a single LED array and two spatial light modulators;

FIGS. 4b and 4c show the spectral transmittance of the dichroic bandpass filters;

FIGS. 7b, 7c, and 7d show the ideal spectral response of X-cube coatings for the configuration shown in FIG. 7a;

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Theoretical Background for Expanding Color Gamut

Figure 1:
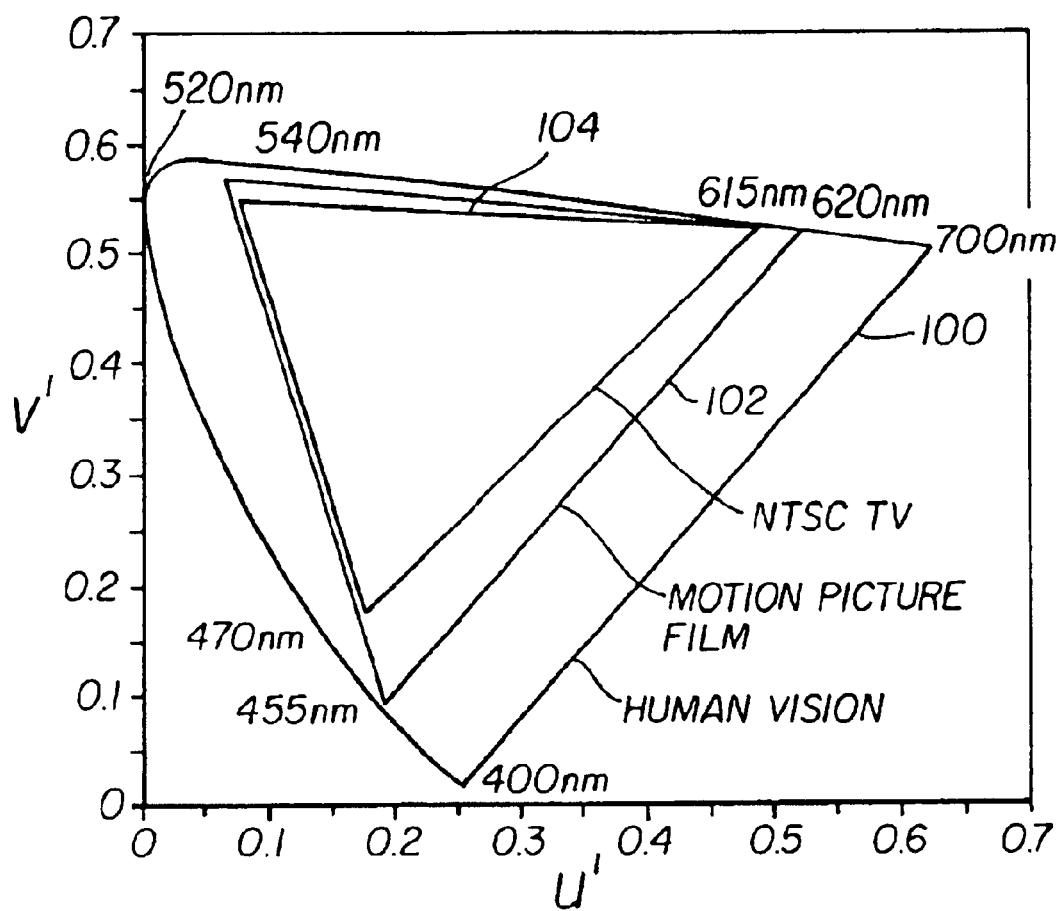
FIG. 1 is a graph showing conventional color gamut representation for NTSC TV and conventional motion picture film.

Referring back to the gamut mapping arrangement shown in FIG. 1, it is instructive to mention that a basic strategy for expanding the gamut of a display is to use color sources that are on or close to the periphery of the visible gamut horseshoe. Lasers, provide ideal spectrally pure, saturated sources that can be mapped directly to points lying on the horseshoe curve of visible gamut 100. However, lasers are not the best solution for low-power displays, due to cost, safety, and design complexity. Instead, LEDs, while they exhibit lower levels of spectral purity and brightness, are substantially cheaper and can provide sufficient brightness for illuminating modest size display areas, suitable for displays in the consumer market. Therefore, LEDs provide the color light sources of the preferred embodiment.

Figure 2A:
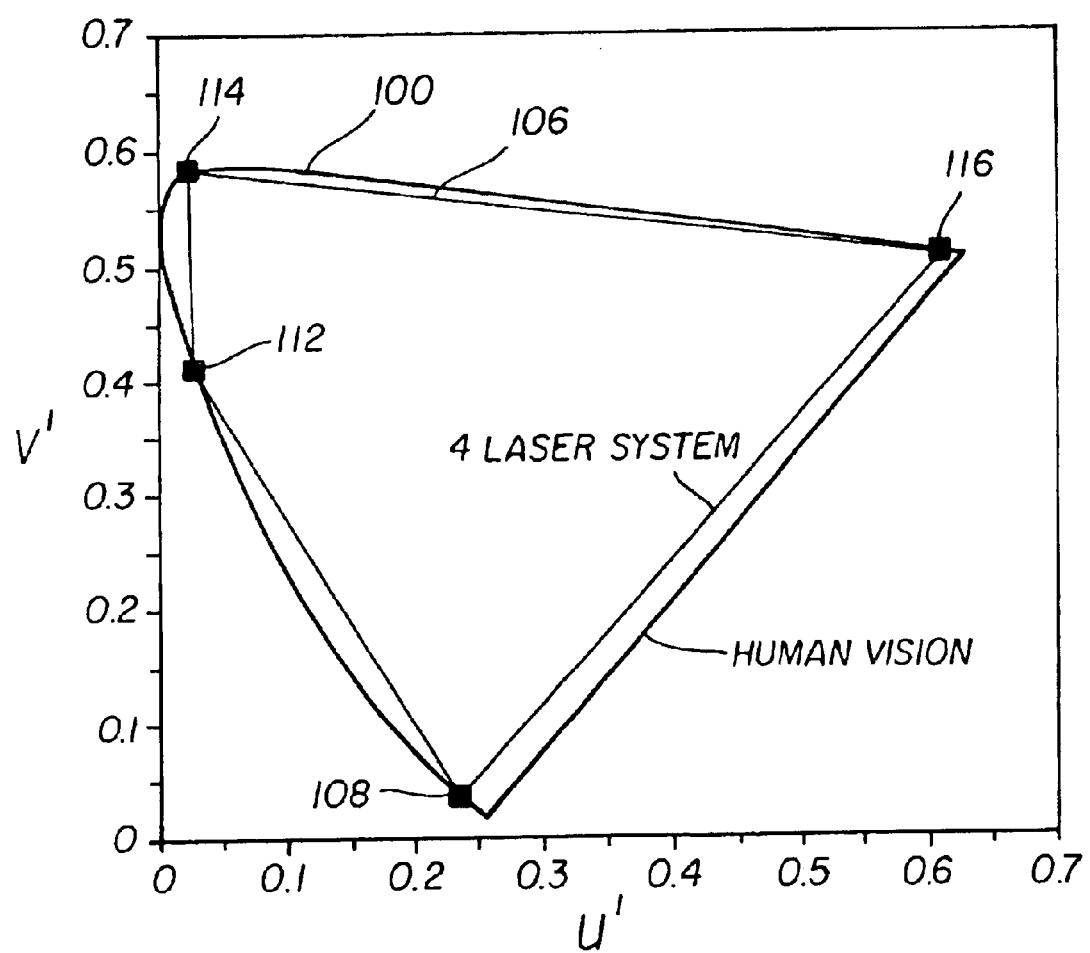

Referring to FIG. 2a, there is shown visible gamut 100 with a four-source gamut 106. With the use of four LEDs, a considerable portion of visible gamut 100 can be represented, as shown. LEDs would be selected with appropriate wavelengths for establishing each of vertices 108, 112, 114, 116 in four-source gamut 106.

Figure 3:
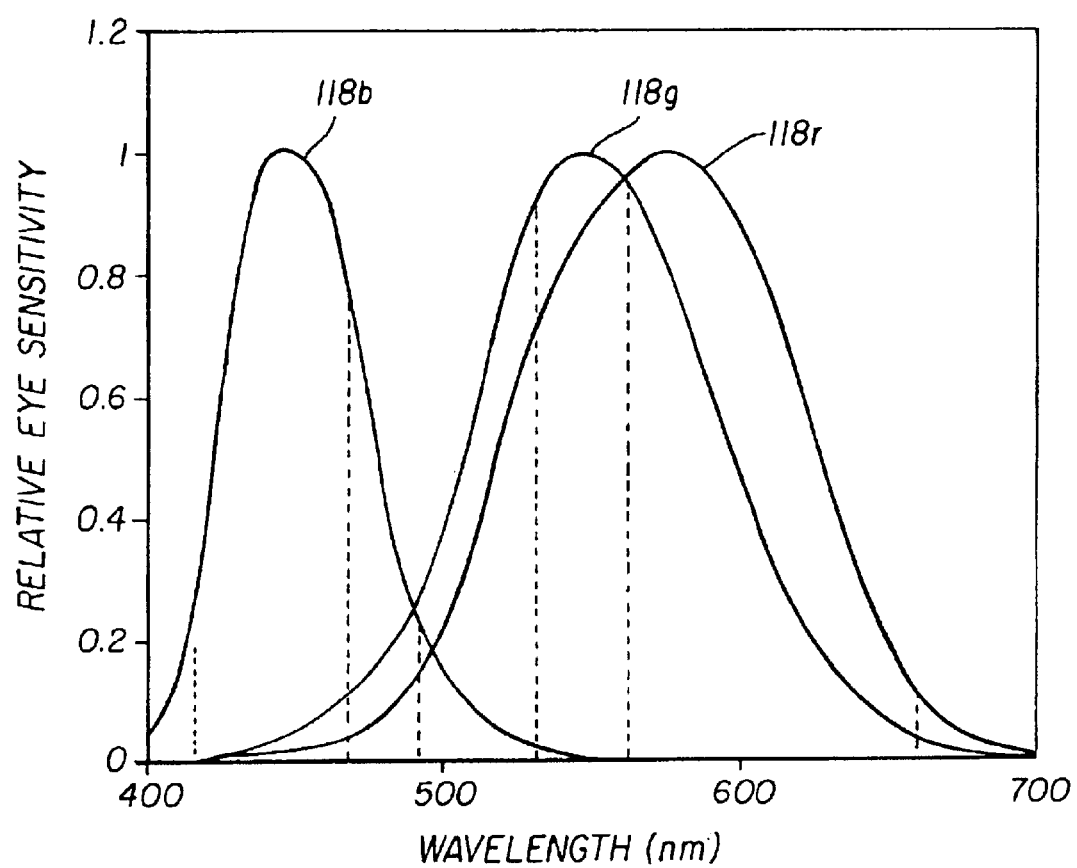
FIG. 3 is a graph showing the cone sensitivity of the human eye relative to wavelength.

FIG. 2b shows the increased color gamut achieved by selecting six component color wavelengths. The colors used for vertices 152, 150, 148, 146, 144, and 142 are red, yellow-green, green, blue-green, blue and blue-violet, respectively. As FIG. 2b shows, this gamut covers virtually the entire range of visible gamut 100. The selection of optimal light source wavelengths, corresponding to vertices 152, 150, 148, 146, 144, and 142 depends upon which portions of visible gamut 100 need to be within the gamut of the display apparatus. A key factor in this consideration is human-eye response. Referring to FIG. 3, there is shown the normalized sensitivity of the three types of color receptors (cones) in the retina. Blue response is indicated by a blue sensitivity curve 118b; red response by a red sensitivity curve 118r; and green response by a green sensitivity curve 118g. Dotted vertical lines indicate the six wavelengths noted above for vertices 152, 150, 148, 146, 144, and 142. With respect to FIG. 3, note that the blue response is reasonably well separated, while there is considerable overlap of the red and green receptors, allowing considerable discrimination of colors in this region by judging the proportions of green and red. It is instructive to emphasize that the goal in color projection is to elicit an eye-brain color response that is as nearly identical to that caused by the original scene content as possible. For example, the original scene object may include bluish-green seawater, which reflects colors within the solar spectrum. Projection provides the same eye-brain response of the scene content, as closely as possible. While this can be accomplished using an appropriate combination of blue and green sources, the green source can unintentionally stimulate the eye's red receptor, as is suggested in FIG. 3. For this reason, alternate use of a light source in a blue-green overlap region may be preferable for such scene content, eliciting the needed response from eye receptors. The impact of this choice on perceived color gamut is best visualized graphically using the CIE chromaticity diagram, such as those of FIGS. 1, 2a, and 2b. The selection of a suitable fourth spectrally pure light source expands the color gamut in that direction. Based on the chromaticity diagrams of FIGS. 1, 2a, and 2b and on the characteristic eye response of FIG. 3, it can be seen that, while there would be little advantage, for example, in selecting multiple light sources from the red and orange wavelengths, there could be substantial benefits in selecting an additional light source having a color in the blue-green wavelength. Another suitable alternative may be selection of a light source having a wavelength in the yellow-green color range. A similar process is used to select the six LED wavelengths that best serve the goal of maximizing the color gamut of the display device.

Preferred Embodiment for Display System 10

Referring to FIG. 4a, there is shown a display system 10 of the present invention, having a modulation path for each of six component colors. In FIG. 4a and following, the color of each modulation path is indicated as follows: R for the red modulation path, YG for the yellow-green path, G for the green path, BG for the blue-green path, B the blue path, and V for the violet path. Similarly, numbered components specific to a color modulation path may be labeled, where necessary, using an appended r, g, b, yb, yg, or v. For the purpose of the following description, however, the appended letter is omitted, except where necessary to distinguish activity distinctive to a particular color path.

With reference to FIG. 4a, light modulation for each color is similar. Light source 12, an LED or a multicolor LED array in the preferred embodiment, provides the source illumination that is modulated. Uniformizing optics 14 and a telecentric condenser lens 16, which may be an individual lens but is more likely a set of lenses, provide the source light beam as essentially homogeneous, telecentric light which is directed toward a spatial light modulator 20 by a polarizing beamsplitter 18. Polarizing beamsplitter (PBS) 18 transmits light having a p-polarization state to spatial light modulator 20 and reflects light having an s-polarization state as incident light to a spatial light modulator 21. Since light sources 12 are not polarized, half the light of each color goes to each spatial light modulator 20 and 21. This means that half of the light from each light source 12 is modulated, the other half is wasted. To block unwanted light, bandpass filters 19a and 19b are positioned between polarizing beamsplitter 18 and each spatial light modulator 20 and 21. As shown in FIG. 4b, bandpass filter 19a transmits violet, blue and red (V, B, R) and blocks blue-green, green and yellow-green (B-G, G, Y). As is shown in FIG. 4c, bandpass filter 19b is the reverse of bandpass filter 19a, transmitting blue-green, green and yellow-green (B-G, G, Y). Spatial light modulator 20 sequentially modulates R, V, B light, preferably in that order, while spatial light modulator 21 sequentially modulates BG, G, and YG light, preferably in that order. Thus, the BG and the R light sources 12 are on at the same time as the corresponding BG and R data are applied to appropriate spatial light modulators 20 and 21.

To minimize intensity flicker, the following pairings of colors simultaneously modulated are used in a preferred embodiment: R is paired with BG, V is paired with G, and B is paired with YG. This arrangement pairs the highest luminance color with the lowest luminance color, the next highest with the next lowest, and so forth.

In the preferred embodiment, spatial light modulator 20 or 21 is a reflective LCD. Spatial light modulators 20, 21, provide selective, variable rotation of light polarization for each individual pixel, as is well known in the imaging arts, to modulate incident light and provide a modulated color beam. Acting as a combiner, polarizing beamsplitter 18 reflects the modulated light from spatial light modulator 20 and transmits the modulated light from spatial light modulator 21 toward a projection lens 110 which then directs the combined colored modulated light onto a display surface 140. The display surface 140 could be an opaque glass-beaded screen typical of slide and movie projection, or, more likely, it is a rear projection screen intended for direct viewing, as in a preferred embodiment.

FIG. 4a shows one possible arrangement of color modulation paths, as used in a preferred embodiment. It is instructive to note that other criteria for pairing colors could be used. For example, colors could be paired in order to minimize changes in setup voltage on a given spatial light modulator 20, 21. To do this, colors close in wavelength would be sent to each spatial light modulator 20, 21 such that the setup voltage change from color to color would be minimal, minimizing the settle time. Colors would be paired according to the polarization state of each light source 12 that is modulated, in order to balance the modulation load and timing between spatial light modulators 20 and 21.

The preferred embodiment of FIG. 4a admits a number of alternative types of components for performing the various light conditioning, modulation, and polarization handling functions. As was stated above, while light source 12 is preferably an LED, other types of light source could be used, such as lasers, for example. Important characteristics for light source 12 include relatively high spectral purity, high brightness level, and correct polarization state when using an LCD as spatial light modulator 20, 21.

Uniformizing optics 14 may comprise any of a variety of lenslet arrays, integrating bar, integrating tunnel, such as the LightTunnel™ available from Unaxis Optics, Liechtenstein, or other optical components suitable for providing illumination over a sufficiently wide field for spatial light modulator 20, 21. In a preferred embodiment, for the illumination beam that is provided through uniformizing optics 14, the width:height aspect ratio corresponds to the width:height aspect ratio of the modulating surface of spatial light modulator 20, 21. This arrangement provides the most efficient use of light and helps to provide a uniform or homogeneous field.

Polarizing beamsplitter 18 is a wire-grid beamsplitter in the preferred embodiment, such as wire-grid polarizing beamsplitters manufactured by Moxtek, Orem Utah. Wire-grid beamsplitters have favorable angular and spectral response and provide relatively high contrast when compared with conventional types of polarizing beamsplitters 18. These devices could alternately be standard MacNeille prisms or other suitable devices. Projection lens 110 and display surface 140 are selected to work together for optimal projection results.

Spatial light modulators 20 and 21 as used in the apparatus of FIG. 4a are reflective LCDs. Alternative types of devices could serve as spatial light modulator 20, 21. For example, a transmissive LCD could be used. With a transmissive LCD, light source 12 would be positioned to transmit light, conditioned by uniformizing optics 14 and condenser lens 16, through spatial light modulator 20, 21. There would be no need for polarizing beamsplitter 18 with a transmissive LCD. As another alternative, a digital micromirror (DMD) or similar device could be employed as spatial light modulator 20, 21. Using a DMD, polarization-conditioning components would not be required. Rather than modulate using polarization, the DMD modulates by reflecting incident light at an angle, as is shown in U.S. Pat. No. 5,905,545, cited above. Methods for directing source light to DMDs are familiar to those skilled in the digital projection arts.

Alternate Embodiment Using LED Arrays

Figure 5A:
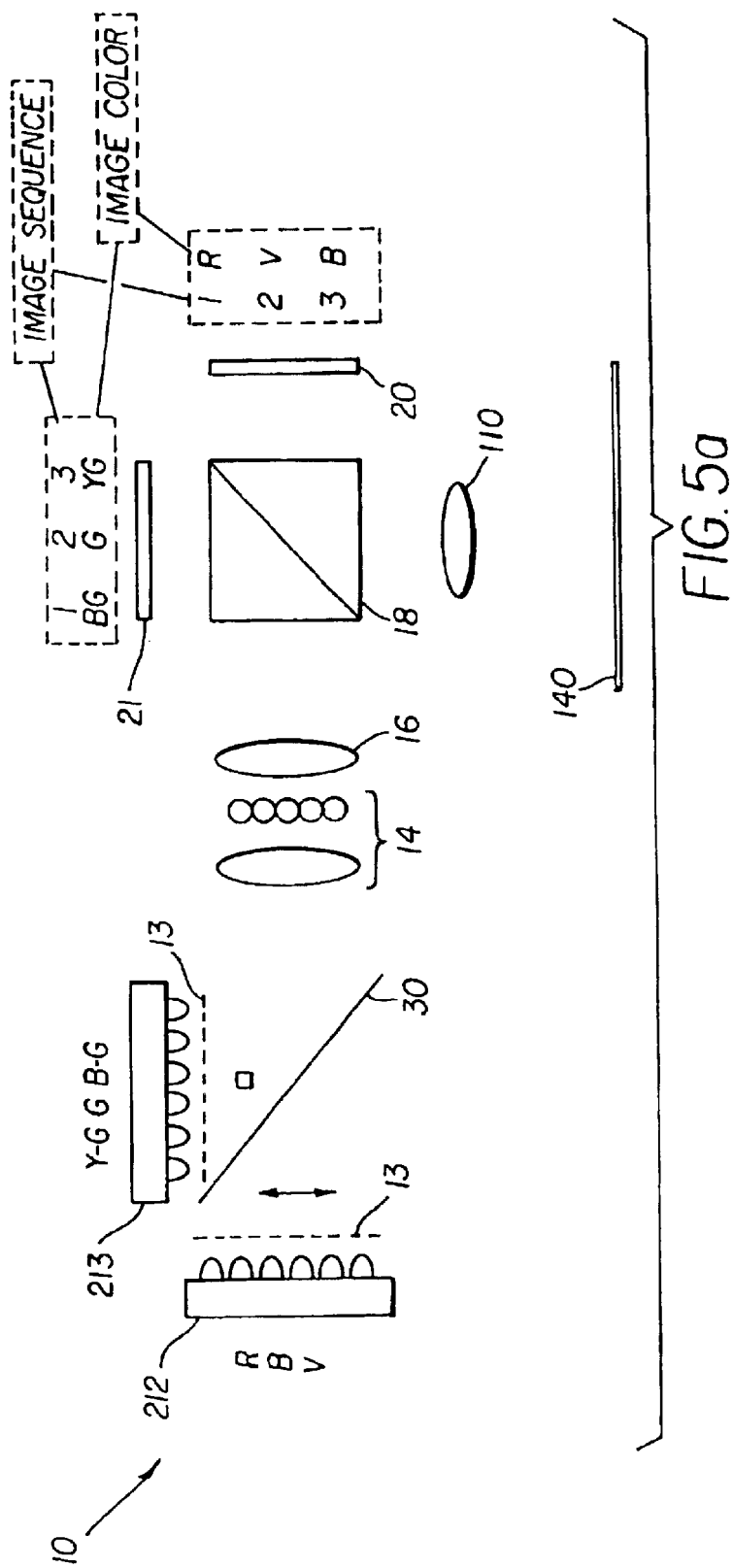
FIG. 5a is a schematic diagram showing a six-color display system using two LED arrays and two spatial light modulators.
Figure 5B:
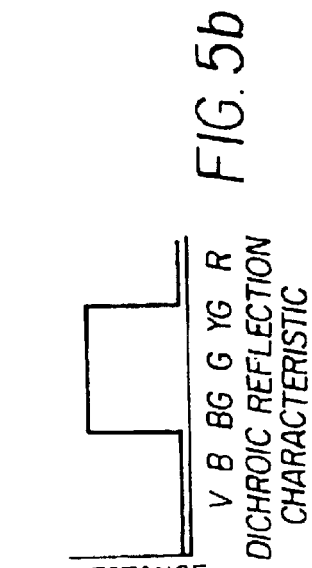
FIG. 5b shows the dichroic combiner reflectivity.

FIG. 5a shows an alternate embodiment of display system 10 that provides improved brightness using first and second LED arrays 212 and 213 and two LCD spatial light modulators 20, 21. As in the embodiment of FIG. 4a, two LCD spatial light modulators 20, 21 allow faster projection of all the colors and the pairing of colors to minimize flicker. First LED array, 212 contains red, blue and violet LEDs which have p-polarization (symbolized by the arrow) using a polarizer 13. Alternately, second LED array 213 contains yellow-green, green and blue-green LEDs which are polarized to s-polarization (represented by dot) by a second polarizer 13. The two source beams are combined by a dichroic combiner 30 and conditioned by uniformizing optics 14 and condenser lens 16. The reflectivity characteristic of dichroic combiner 30 is shown in FIG. 5b. Returning to FIG. 5a, the light is then directed to spatial light modulators 20 and 21 depending on polarization. The p-polarized light is transmitted to spatial light modulator 20 which modulates, in sequence, the red, violet, and blue images, arranged in that order for minimum flicker. The s-polarized light is reflected to spatial light modulator 21 which modulates, in sequence, the blue-green, green, and yellow-green light, arranged in that order for minimum flicker when paired with the corresponding color from spatial light modulator 20. The polarization of the light is rotated by the color image signal impressed on spatial light modulator 20 or 21 at the time the appropriate LED from first or second LED array 212 or 213 is turned on. This image bearing beam is then directed by polarizing beamsplitter 18 to projection lens 110 and to projection screen 140.

Color pairing and sequencing is selected to minimize flicker in the projected image. In the preferred embodiment described above, the red and blue-green LEDs are paired together and simultaneously modulated at spatial light modulators 20 and 21 respectively. Next, violet and green light are modulated at the same time. Then, blue and yellow-green light are modulated. Other sequences and other color pair combinations can be used, as determined by those skilled in the art. For example, one obvious variation would simply reverse the sequential order. Using an alternative grouping of colors on LED arrays 212 or 213 is also possible, with added coating complexity for dichroic combiner 30. Other factors influencing the color sequence include the rise and fall time and relative bias voltage settle times of spatial light modulators 20 and 21 for different colors. For example, if each color requires a different bias voltage, it may be beneficial to modulate colors in a sequence most favorably arranged for providing each voltage level. For the preferred embodiment, however, intensity flicker is an overriding concern.

There are numerous options for optimizing image quality and overall device response time. For example, to minimize settling time, a single setup voltage can be used for modulating two or three colors at a spatial light modulator 20 or 21. Then, minor adjustments could be made directly to the image data, modifying the image data using a calibration look-up-table (LUT), as is well known in the digital imaging art. Alternately, dichroic combiner 30 could combine crossed polarizations rather than similar polarizations. A number of variations can be employed to adapt display system 10 for optimal display performance and to reduce cost.

Alternate Embodiment Using Two LED Arrays with Opposite Polarization States

Figure 6A:
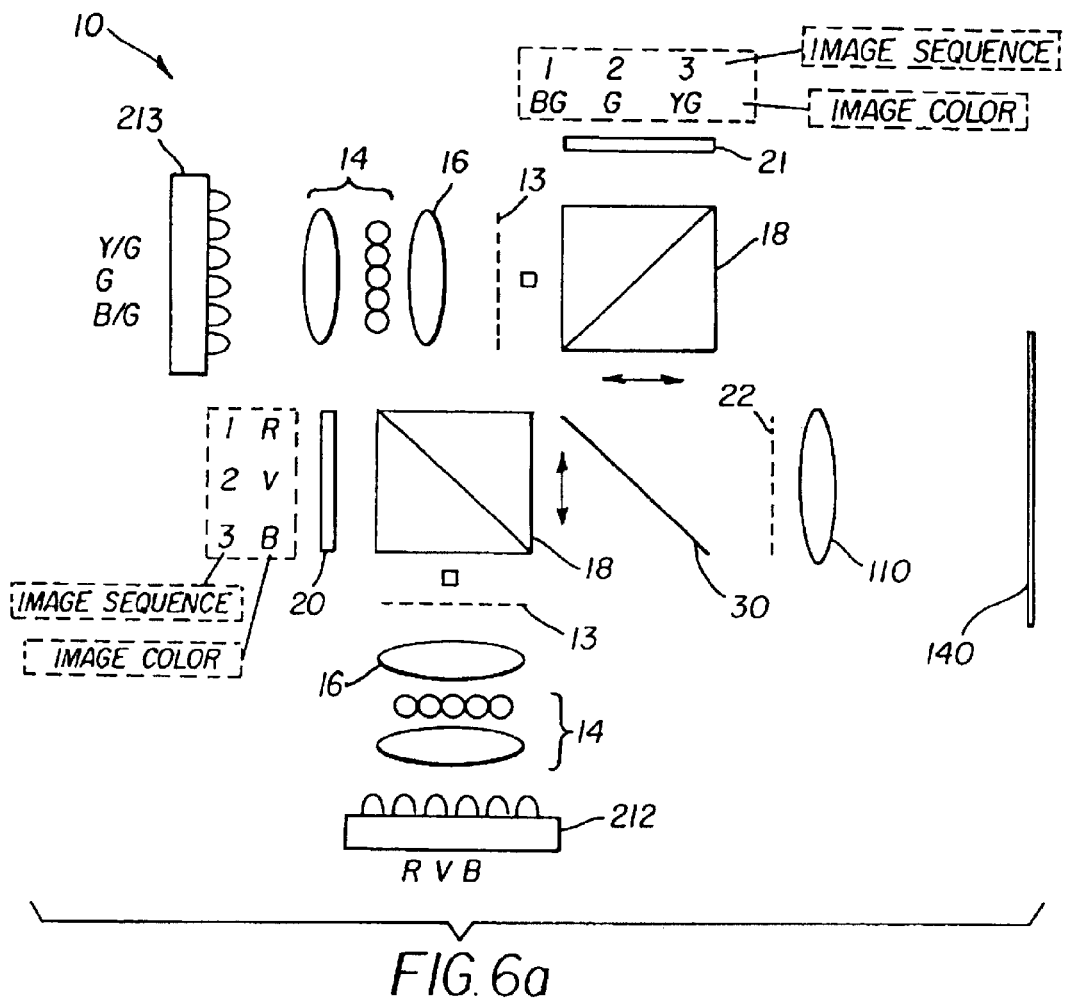
FIG. 6a is a schematic diagram of a six color display system using two LED arrays and two spatial light modulators, where the beams are combined after modulation.
Figure 6B:
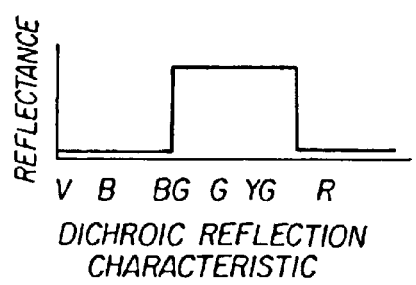
FIG. 6b shows the dichroic combiner reflectivity.

Referring to FIG. 6a, there is shown another embodiment of display system 10 using six colors. Similar to the apparatus of FIG. 5a, two LED arrays 212 and 213 are used to provide source illumination for two spatial light modulators 20 and 21. In this embodiment, the image bearing beams having the same polarization are combined by dichroic combiner 30, allowing an analyzer 22 to be employed in order to enhance contrast. LED array 212 contains red, violet and blue LEDs and LED array 213 contains blue-green, green, and yellow-green LEDs. The light from each LED array 212 and 213 is conditioned by uniformizing optics 14 and condenser lens 16. The light is s-polarized by polarizer 13 and is reflected by polarizing beamsplitter 18 to spatial light modulator 20 or 21. The modulated light beams leaving spatial light modulators 20 or 21, both p-polarized, are combined by dichroic combiner 30. The combined modulated beam then passes through analyzer 22 which reduces leakage light having unwanted polarization and thereby increases contrast. The modulated beam then is projected onto screen 140 by projection lens 110. FIG. 6b shows the ideal spectral reflection characteristic of dichroic combiner 30.

Alternate Embodiment Using Three LED Arrays

Figure 7A:
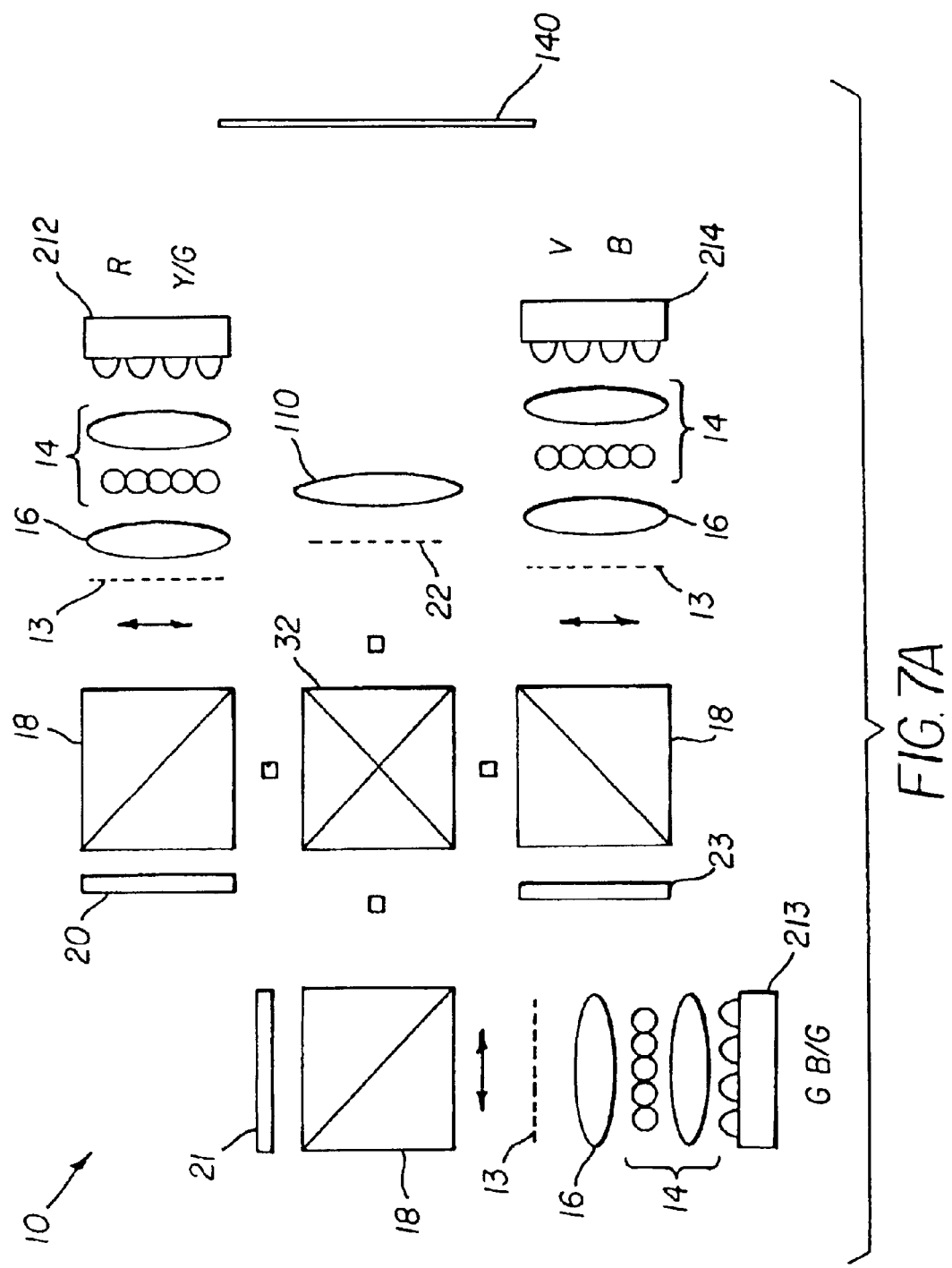
FIG. 7a is a schematic diagram of a six color display system using three LED arrays and three spatial light modulators.

Referring to FIG. 7a, there is shown yet another embodiment of display system 10 using six colors. In this embodiment, three LED arrays 212, 213, and 214 are employed along with three spatial light modulators 20, 21, 23. The deployment of additional LED array 214 and spatial light modulator 23 allows improved speed and improved brightness, with added cost and complexity. Analyzer 22 can also be used in this embodiment to increase contrast. First LED array 212 contains red and yellow-green LEDs, second LED array 213 contains green and blue-green LEDs, and third LED array 214 contains blue and violet LEDs. Each of the three modulation channels has a similar structure. Following the red channel, red LEDs in LED array 212 are provide source red illumination to spatial light modulator 20. The red light is conditioned by uniformizing optics 14 and by condenser lens 16 and is p-polarized by polarizer 13. In this embodiment, the red light is transmitted through polarizing beamsplitter 18 and incident on spatial light modulator 20. The image modulated light is then s-polarized and is reflected to an X-cube 32 which acts as a color combiner. Conventional X-cubes 32 require s-polarized light for red and blue channels, but accept light having either polarization in the green channel. X-cube 32 reflects the red beam toward display surface 140. Analyzer 22 eliminates unwanted polarization components and projection lens 110 focuses the full color image onto screen 140. X-cube 32 combines all six colors: the red channel (red and yellow-green) and blue channel (blue and violet) are reflected and the green channel (green and blue-green) is transmitted. With this arrangement, red, green and blue colors are modulated simultaneously. Then yellow-green, blue-green and violet are modulated. This process then repeats for the next image. The technique of combining brighter, high luminance colors with dimmer, lower luminance colors in this way minimizes the intensity flicker to the eye. Certainly, other combinations and sequences could be used.

Figure 7B:
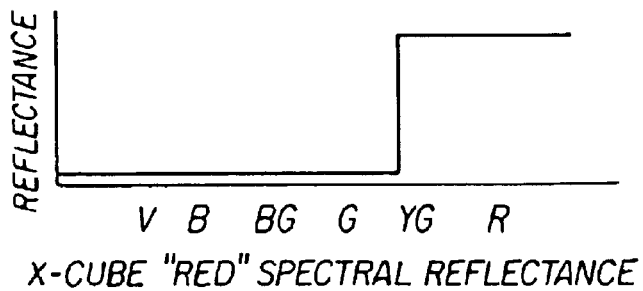
Figure 7C:
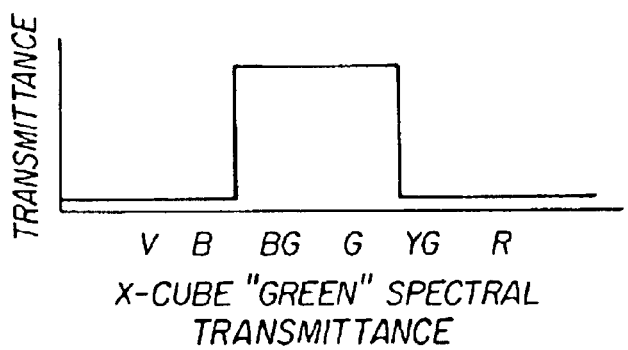
Figure 7D:
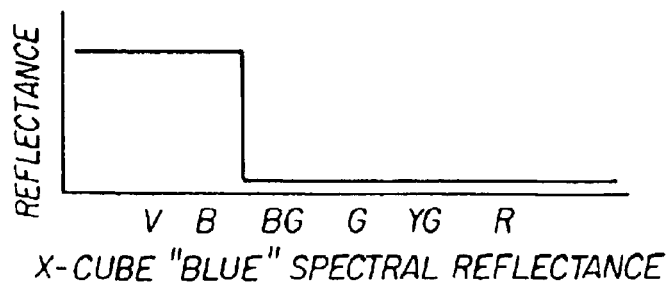

FIGS. 7b, 7c, and 7d show ideal response curves for dichroic coatings within X-cube 32.

Alternate Embodiment Using an LED Array for Each Color

Figure 8:
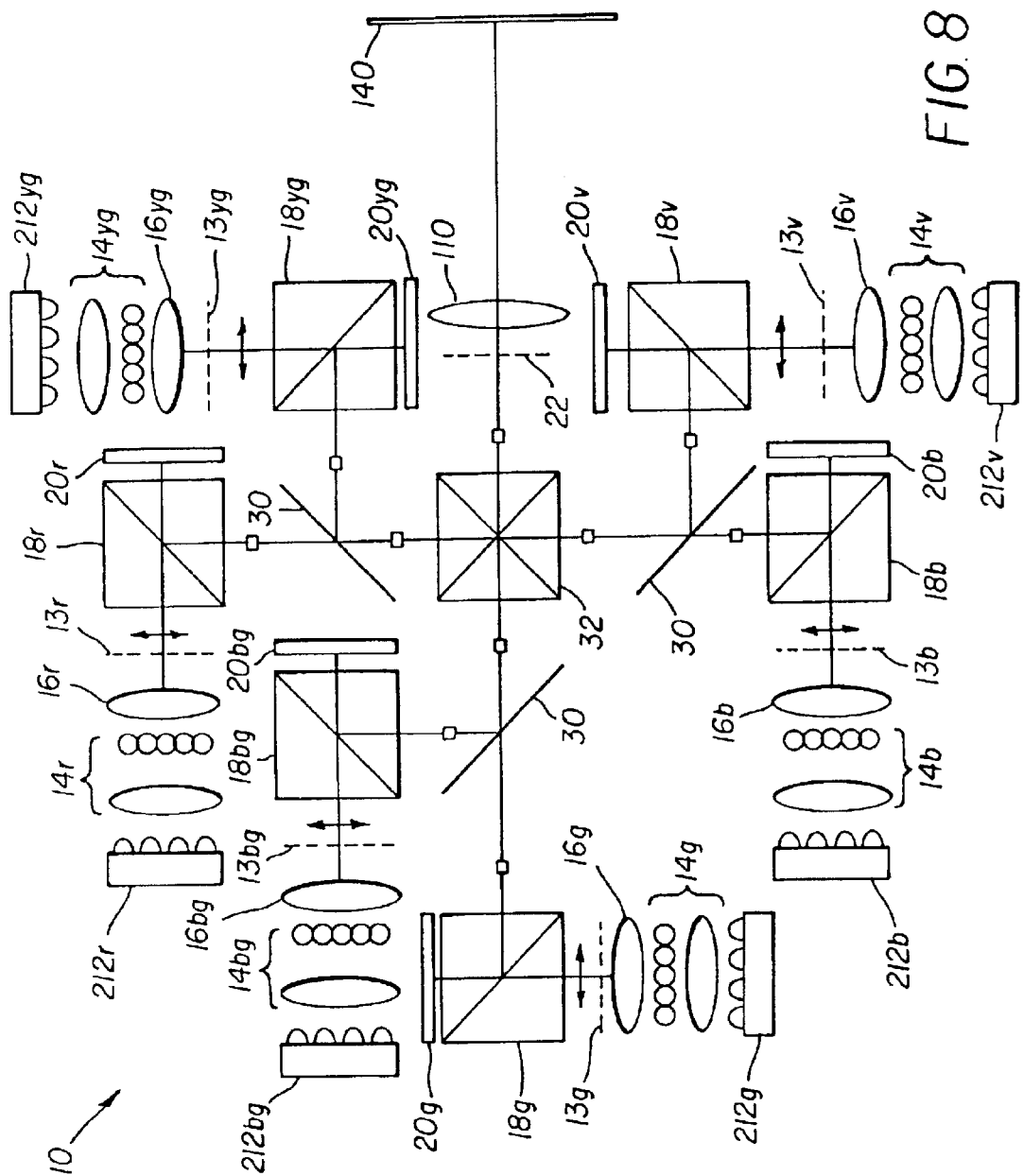
FIG. 8 is a schematic diagram of a six-color display system using six LED arrays and six spatial light modulators.

Referring to FIG. 8, there is shown a schematic diagram of yet another embodiment of display apparatus 10 using six colors. This embodiment uses six LED arrays 212r, 212yg, 212g, 212bg, 212b, and 212v one of each color corresponding to vertices 152, 150, 148, 146, 144, and 142 respectively in FIG. 2b. Correspondingly, the embodiment of FIG. 8 has six spatial light modulators 20r, 20yg, 20g, 20bg, 20b, and 20v, one for each LED array 212r, 212yg, 212g, 212bg, 212b, and 212v. Within each color path are provided uniformizing optics 14r, 14yg, 14g, 14bg, 14b, and 14v as well as condenser lens 16r, 16yg, 16g, 16bg, 16b, and 16v and polarizer 13r, 13yg, 13g, 13bg, 13b, and 13v. In each color path, a polarizing beamsplitter 18r, 18yg, 18g, 18bg, 18b, and 18v directs light to the corresponding spatial light modulator 20r, 20yg, 20g, 20bg, 20b, and 20v. Dichroic combiners 30 and X-cube 32 combine the modulated color output to provide the complete, six-color image on display surface 140. The most complex and expensive of the embodiments presented, the arrangement of FIG. 8 offers the advantage of flicker-free display along with the optimum speed and brightness. In addition, each spatial light modulator 20r, 20yg, 20g, 20bg, 20b, and 20v can be tuned for optimum performance for each color, without the need for settle time needed to adjust device bias voltages between colors. It is anticipated that a future benefit of HDTV development will be a substantial reduction in LCD device cost, making the arrangement of FIG. 8 more practical and economical in consumer products. This type of reduction may not possible, however, for commercial projection display systems requiring very high resolution devices with a 4:3 aspect ratio.

Referring again to FIG. 8, both red and yellow-green modulated light, combined onto a single axis using dichroic combiner 30, are at one input of X-cube 32. This same pattern is repeated for the modulated light pair at each of the other two inputs of X-cube 32. The red and yellow-green modulated beam is reflected from X-cube 32 through analyzer 22 and projected onto a screen 140 by the projection lens 110. Likewise, the blue and violet modulated beam, from the opposite side of X-cube 32, is reflected toward projection lens 110 by X-cube 32. The green and blue-green modulated beam is transmitted through X-cube 32 for projection.

Methods for Alleviating Design Complexity

Among the problems that must be addressed when using six spatial light modulators 20r, 20yg, 20g, 20bg, 20b, and 20v is precise optical alignment, so that modulated light combines onto a single axis for projection by projection lens 110. To simplify the alignment problem, the present invention applies the following techniques:

(a) Align green and yellow-green spatial light modulators 20g and 20yg with the greatest possible precision. Because the green and yellow-green, having the highest luminance, are the most visible to the eye, the alignment of these two colors with respect to each other is the most critical. The blue and violet images, on the other hand, are the least critical.

(b) Vary the resolution based on color channel. As is known with respect to color TV, there are advantages in providing the highest resolution image from the color channel having the highest luminance. Other channels, primarily needed for chrominance, are not as critical for providing resolution. Thus, for example, green and yellow-green spatial light modulators 20g and 20yg can have 2000 pixels per line. Meanwhile, blue and violet spatial light modulators 20b and 20v may provide acceptable image output at 500 pixels per line. This modification reduces the bandwidth and storage required. At the same time, the larger pixels of the lower resolution spatial light modulators automatically have relaxed alignment tolerances. For image quality, alignment of a larger image pixel is correspondingly less critical than alignment of a smaller image pixel.

With respect to the alignment of individual colors, it would also be possible to omit dichroic combiners 30 or other combining components and to project each modulated colored light beam separately onto display surface 140, using a separate projection lens 110 for each color. However, such an arrangement can be considerably more cumbersome and costly.

Alternate Embodiments Using OLEDs

Figure 11A:
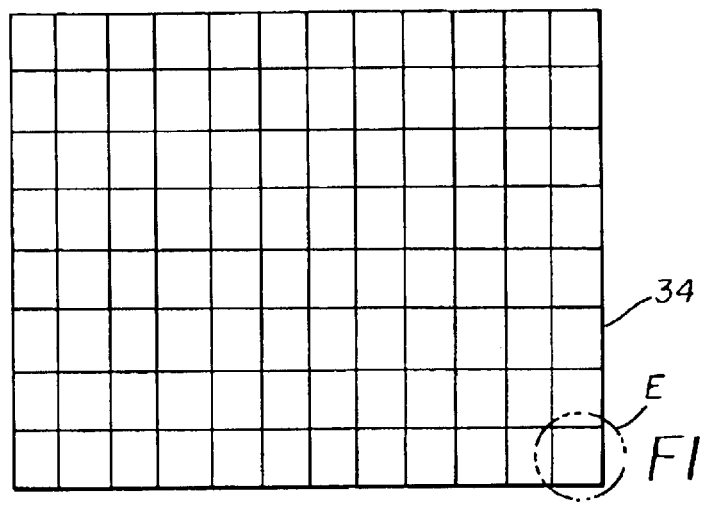
FIGS. 11a and 11b show a 6 color display apparatus using an OLED.
Figure 11B:
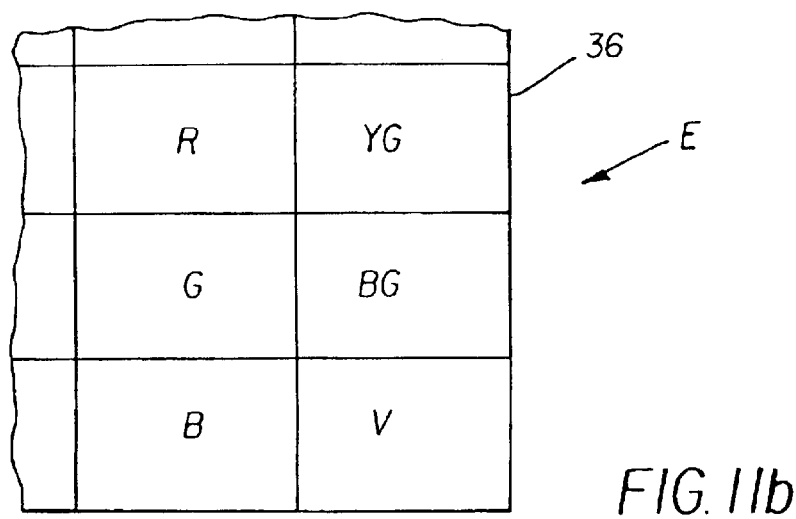

Referring to FIG. 11a, there is shown a block diagram of a portion of an organic light emitting diode (OLED) display 34 used for display system 10 in an alternate embodiment. Referring to FIG. 11b, there is shown, for an area E of a single pixel, an enlarged view of an OLED pixel 36. OLED display 34 comprises an array of OLED pixels 36 where each OLED pixel 36 consists of a cluster of six OLEDs: red, yellow-green, green, blue-green, blue, and violet, as shown. Pixels of each color are driven to the proper intensity level according to image data for that color. The path of image data and OLED driver components would follow conventionally practiced methods for OLED display and are not shown. With OLED display 34, all colors are active simultaneously, producing a high brightness, flicker free display.

OLED displays 34, currently available with limited colors and limited resolution, are becoming commercially available, including devices having the necessary colors for implementing a six-color display device. There are a number of schemes, used for clustering RGB OLEDs, that could be easily adapted by one skilled in the art for use with six colors. The schematic drawing of FIG. 11b shows one straightforward possibility. Alternatives to OLED devices include polymer light emitting diodes (PLEDs).

Figure 12:
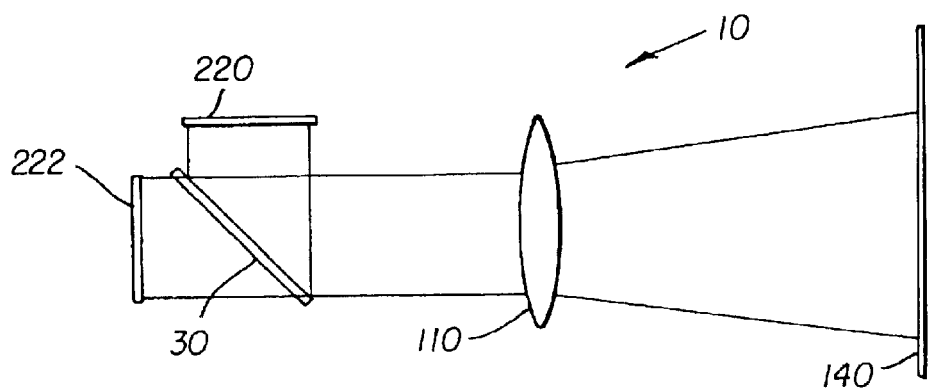
FIG. 12 shows a color display apparatus using two OLEDs.

Referring to FIG. 12, there is shown an alternate arrangement for display system 10 using a first OLED 220 for generating at least two colors and a second OLED 222 for generating at least two additional colors. Dichroic combiner 30 combines the modulated beams from OLEDs 220 and 222 into a single modulated beam that is projected toward display surface 140 by projection lens 110. With this arrangement, less expensive OLED designs may be employed. For example, OLED 220 may generate an RGB image, with OLED 222 generating additional yellow, blue-green, and violet colors to expand the color gamut. Alternately, OLEDs 220 and 222 could be deployed to increase image resolution, with pixel locations mutually offset. For this alternate arrangement, OLEDs 220 and 222 could generate the same three colors or at least one or two of the same colors.

Not shown in FIGS. 4 through 8 and FIG. 11 are logic control components used to direct image data to spatial light modulators 20, 21, and 23. However, techniques and devices for performing these functions are well-known in the imaging arts.

Timing and Color Sequencing When Using Multiple Spatial Light Modulators 20, 21, 23

Figure 9A:
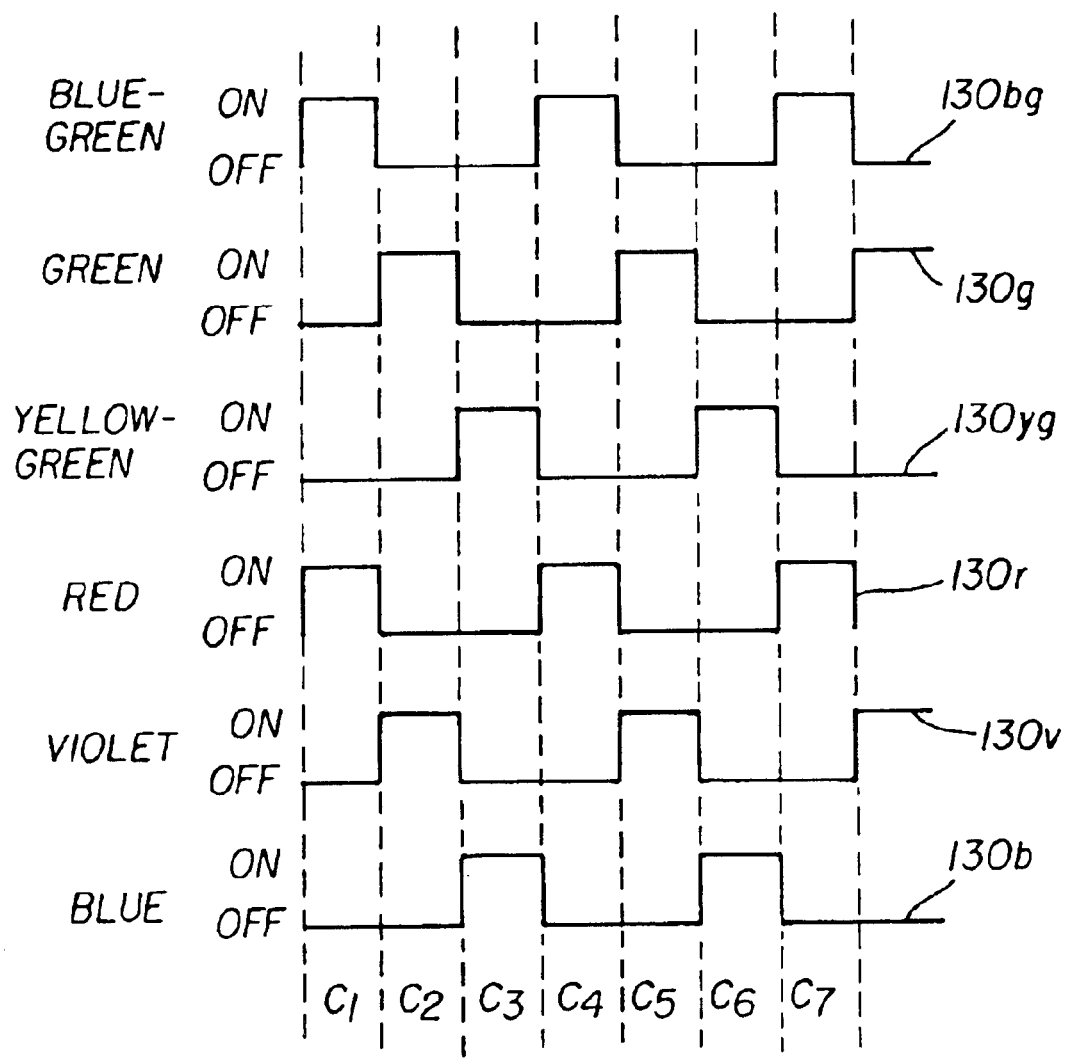
FIG. 9a is a graph showing modulation timing, by color, using the arrangement of a preferred embodiment of the present invention.

Referring to FIG. 9a, there is shown a straightforward multiplexing sequence for timing using multiple spatial light modulators 20 and 21, as described above with reference to display system 10 of FIGS. 4a, 5a, and 6a. For each light path, a corresponding modulation timing waveform 130bg, 130g, 130yg, 130r, 130v, and 130b is shown. During each time period $C_1$–$C_7$, each spatial light modulator 20 and 21 provides modulation for light from one light source 12 or LED array 212, 213. Thus, for example, spatial light modulator 20 sequentially modulates red, violet, and blue light, providing red, violet, and blue modulation timing waveforms 130r, 130v and 130b accordingly. Similarly, spatial light modulator 21 provides blue-green, green, and yellow-green modulation timing waveforms 130bg, 130g and 130yg.

Figure 9B:
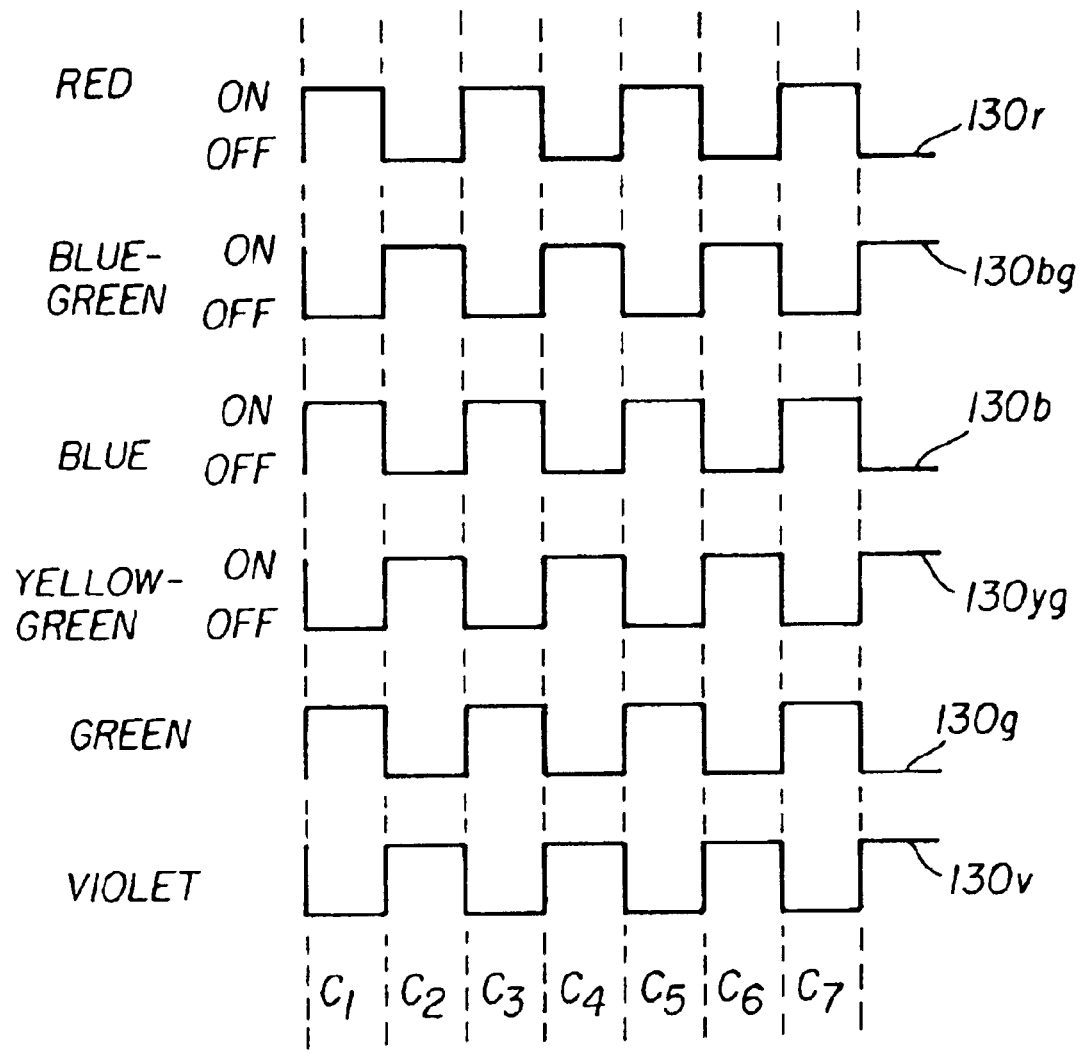
FIGS. 9b and 9c are graphs showing alternate arrangements of modulation timing.

Referring to FIG. 9b, there is shown a timing sequence for display system 10 with the arrangement of FIG. 7a using three LED arrays 212, 213, and 214 with three spatial light modulators 20, 21, 23. Here, the R, G, and B light sources from LED arrays 212, 213, and 214 are modulated at one time, $C_n$. Then in the next timing period, $C_{n+1}$, the YG, BG, and V sources are modulated.

Figure 9C:
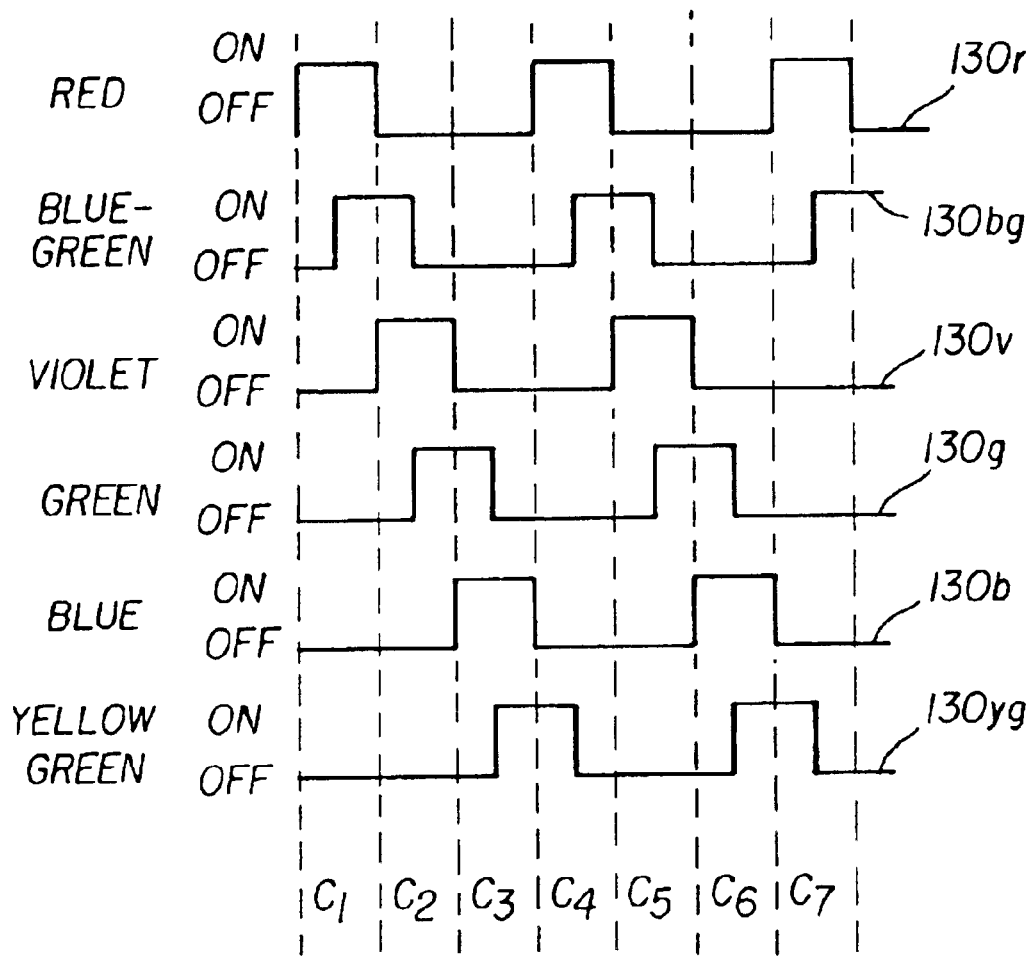

Referring to FIG. 9c, there is shown yet another alternative timing sequence, wherein the modulation periods for each spatial light modulator 20, 21 are offset, with two colors modulated during some portions of periods $C_n$ and with transitions staggered so that only half of the transitions occur simultaneously. The timing arrangement of FIG. 9c could be used for the configurations of display system 10 shown in FIGS. 4a, 5a, and 6a.

The actual timing required by a specific device determines the characteristics of the signal provided to spatial light modulator 20, 21 during each time period $C_n$. Depending on characteristics of the device used as spatial light modulator 20 or 21 and on color response variations, the device setup voltage levels may be different for optimum performance with each color. Thus, part of the device setup required when changing from one illumination color to the next is to adjust bias voltage level $V_c$ accordingly. As was noted above, because this adjustment requires response time, there would be advantages in eliminating the need to make a bias voltage level $V_c$ adjustment between colors, or at least in minimizing the difference between two distinct bias voltage levels $V_c$ for the colors that are paired to a single spatial light modulator 20 or 21. In prior art embodiments described in the background material above, where three primary colors (typically R, G, and B) share the same spatial light modulator, it is unlikely that optimum setup voltage levels are the same for all three colors. However, as was described with reference to FIG. 7a, where only two colors share the same spatial light modulator 20 or 21, or with reference to FIGS. 4a, 5a and 6a where three colors share the same spatial light modulator, it may be advantageous to group colors based on this setup voltage level requirement. In some cases, an average or compromise voltage can be used, allowing look-up tables or other techniques to compensate for slight differences in device response. Where a single voltage cannot be used for setup voltage level, it can be possible to group colors so that very little difference in voltage is needed, minimizing device settling time requirements.

It is instructive to note that the timing waveforms of FIGS. 9a, 9b, and 9c are exemplary, showing only some of the timing possibilities for six colors, and are not intended to be limiting. Alternate arrangements are possible, particularly since device timing is under control of electronic timing circuitry (not shown) that can be synchronized with the data that is sent to spatial light modulators 20 and 21. Unlike conventional color film projection, with a fixed rate of 24 frames per second (increased to 48 frames per second due to double-shuttering), digital display apparatus can vary the period $C_n$ timing to better suit the needed brightness and overall image quality conditions of the viewing environment. While there are some well-established timing constraints, such as those relating to frequencies for flicker detection by the human eye, there appears to be some flexibility in terms of light intensity and duration for providing motion color images. Thus, for example, while periods $C_n$ in FIG. 9a may work well at $\frac{1}{48}$ second, the periods $C_n$ of FIG. 9c may provide better image quality at $\frac{1}{66}$ second.

Figure 10A:
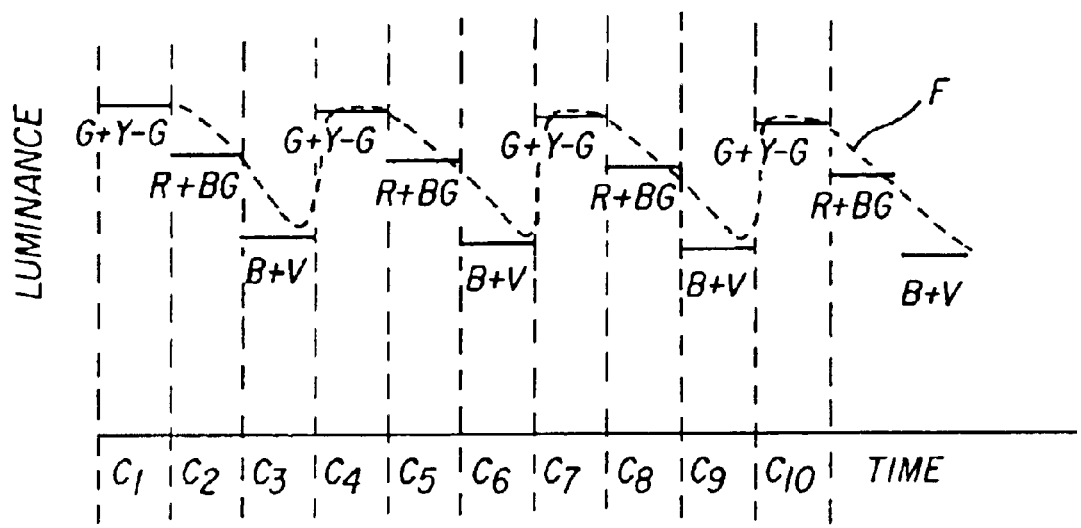
FIGS. 10a and 10b are timing diagrams showing sequences of color transitions as a cycle of luminance-level transitions.
Figure 10B:
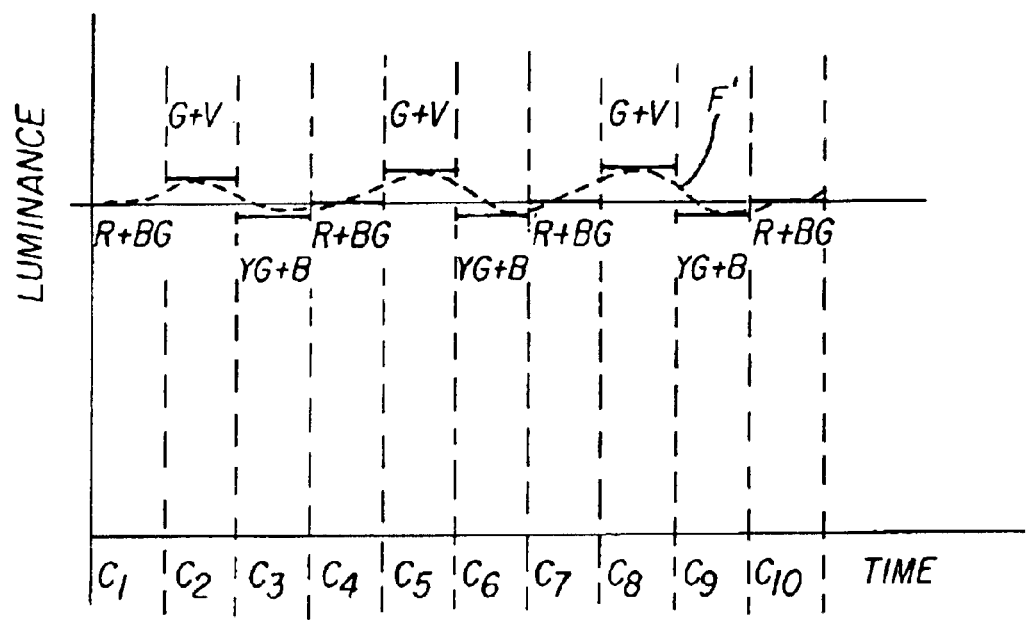

One consideration for color sequencing, noted above, relates to minimizing flicker effects. When viewing image frames displayed in rapid succession, the sensitivity of the human eye to flicker depends on the luminance difference between frames as well as on the frequency. Thus, controlling luminance transitions and frequency may be effective for minimizing flicker effects. Referring to FIGS. 10a and 10b, there are shown two alternate sequences for sequential color display, showing relative luminance of each color. In the sequence of FIG. 10a, color modulation cycles through a pairing of brightest and dimmest colors G+YG, R+BG, and B+V so that luminance change is large and has an apparent frequency illustrated by line F. In contrast, the sequence of FIG. 10b shows modulation cycled through a sequence of colors with a different pairing, so that the luminance variation is minimized. Thus, a simple rearrangement of the color sequence may minimize the visibility of flicker in a six-color display. However, it must be observed that the luminance is a function of both the wavelength and the power available. Rearrangement of the ideal pairing may be necessitated by a particularly weak or strong source. Power delivered to any of the color sources may be adjusted to adjust luminance level correspondingly.

It can be appreciated that the present invention provides an apparatus and method that allows projection of bright images with an expanded color gamut. In a preferred embodiment, the present invention has advantages in implementation over field-sequential solutions that use a single spatial light modulator, but without the added cost required for apparatus that use simultaneous modulation and a spatial light modulator for each color. Using two or more spatial light modulators 20 and 21, each modulating at least two colors, display system 10 of the present invention meets the goal of providing improved color gamut, but with less cost and with fewer timing constraints than with other solutions.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

Thus, what is provided is an apparatus and method for displaying high-resolution images from digital data using two or more spatial light modulators, wherein an improved color gamut can be obtained.

PARTS LIST

10 Display system
12 Light source
12r Red light source
12yg Yellow-green light source
12g Green light source
12bg Blue-green light source
12b Blue light source
12v Violet light source
13 Polarizer
13r Polarizer, red light path
13yg Polarizer, yellow-green light path
13g Polarizer, green light path
13bg Polarizer, blue-green light path
13b Polarizer, blue light path
13v Polarizer, violet light path.
14 Uniformizing optics
14r Uniformizing optics, red light path
14yg Uniformizing optics, yellow-green light path
14g Uniformizing optics, green light path
14bg Uniformizing optics, blue-green light path
14b Uniformizing optics, blue light path
14v Uniformizing optics, violet light path
16 Condenser lens
16r Condenser lens, red light path
16yg Condenser lens, yellow-green light path
16g Condenser lens, green light path
16bg Condenser lens, blue-green light path
16b Condenser lens, blue light path
16v Condenser lens, violet light path
18 Polarizing beamsplitter
18r Polarizing beamsplitter, red light path
18yg Polarizing beamsplitter, yellow-green light path
18g Polarizing beamsplitter, green light path
18bg Polarizing beamsplitter, blue-green light path
18b Polarizing beamsplitter, blue light path
18v Polarizing beamsplitter, violet light path.
19a Bandpass filter
19b Bandpass filter
20 Spatial light modulator
20r Spatial light modulator, red light path
20yg Spatial light modulator, yellow-green light path
20g Spatial light modulator, green light path
20bg Spatial light modulator, blue-green light path
20b Spatial light modulator, blue light path
20v Spatial light modulator, Violet light path.
21 Spatial light modulator
22 Analyzer
23 Spatial light modulator
30 Dichroic combiner
32 X-cube
34 OLED display
36 OLED pixel
100 Visible gamut
102 Motion picture film gamut
104 NTSC TV gamut
106 Four-source gamut
108 Vertices
112 Vertices
114 Vertices
116 Vertices
110 Projection lens
118r Red sensitivity curve
118g Green sensitivity curve
118b Blue sensitivity curve
130 Modulation timing waveform
130r Red modulation timing waveform
130yg Yellow-green modulation timing waveform
130g Green modulation timing waveform
130bg Blue-green modulation timing waveform
130b Blue modulation timing waveform
130v Violet modulation timing waveform
140 Display surface
142 Vertices
144 Vertices
146 Vertices
148 Vertices
150 Vertices
152 Vertices
212 LED array
213 LED array
214 LED array
212r LED array, red light path
212yg LED array, yellow-green light path
212g LED array, green light path
212bg g LED array, blue-green light path
212b LED array, blue light path
212v LED array, violet light path.
220 First OLED
222 Second OLED

What is claimed is:

1. An apparatus for displaying a color image from digital data, the apparatus comprising:
 (a) first modulation system for providing a first modulated beam, said first modulation system comprising:
  (a1) a first spatial light modulator for modulating a first incident light beam in order to form said first modulated beam according to said digital data;
  (a2) a first light source for providing a first color beam as said first incident light beam;
  (a3) a second light source for providing a second color beam as said first incident light beam;
 (b) second modulation system for providing a second modulated beam, said second modulation system comprising:
  (b1) a second spatial light modulator for modulating a second incident light beam in order to form said second modulated beam according to said digital data;
  (b2) a third light source for providing a third color beam as said second incident light beam;
  (b3) a fourth light source for providing a fourth color beam as said second incident light beam;
 (c) third modulation system for providing a third modulated beam, said third modulation system comprising:
  (c1) a third spatial light modulator for modulating a third incident light beam in order to form said third modulated beam according to said digital data;
  (c2) a fifth light source for providing a fifth color beam as said third incident light beam;
  (c3) a sixth light source for providing a sixth color beam as said third incident light beam; and (d) an optical combiner for directing said first, second, and third modulated beams toward a lens for projection onto a display surface.

2. An apparatus for displaying a color image according to claim 1 wherein said first modulation system further comprises a polarization beamsplitter for directing polarized light from said first light source to form said first modulated beam.

3. An apparatus for displaying a color image according to claim 1 wherein said polarizer is a wire-grid polarizer.

4. An apparatus for displaying a color image according to claim 1 wherein said first light source is taken from the group consisting of LEDs and lasers.

5. An apparatus for displaying a color image according to claim 1 further comprising a uniformizer for providing said first color beam having a uniform field.

6. An apparatus for displaying a color image according to claim 5 wherein said uniformizer is from the group consisting of lenslet array, integrator bar, integrating tunnel.

7. An apparatus for displaying a color image according to claim 5 wherein said uniformizer adapts the aspect ratio of said first incident light beam to the aspect ratio of said first spatial light modulator.

8. An apparatus for displaying a color image from digital data according to claim 1 wherein the resolutions of said first, second, and third spatial light modulators are not all equal.

9. An apparatus for displaying a color image from digital data, the apparatus comprising:
  (a) a first spatial light modulator for modulating a first incident light beam from a first light source to form a first color modulated beam;
  (b) a second spatial light modulator for modulating a second incident light beam from a second light source to form a second color modulated beam;
  (c) a third spatial modulator for modulating a third incident light beam from a third light source to form a third color modulated beam;
  (d) a fourth spatial light modulator for modulating a fourth incident light beam from a fourth light source to form a fourth color modulated beam;
  (e) a fifth spatial light modulator for modulating a fifth incident light beam from fifth light source to form a fifth color modulated beam;
  (f) a sixth spatial light modulator for modulating a sixth incident light beam from a sixth light source to form a sixth color modulated beam;
  (g) means for combining said first, second, third, fourth, fifth, and sixth color modulated beams to form a combined color beam;
  (h) means for projection of said combined color beam onto a display surface; and
  wherein the resolutions of said first, second, third, fourth, fifth, and sixth spatial light modulators are not all equal.

10. An apparatus for displaying a color image from digital data according to claim 9 further comprising means for uniformizing said first color modulated beam.

11. An apparatus for displaying a color image from digital data according to claim 9 wherein said first light source is taken from the set consisting of laser, LED.

12. A method for displaying a color image from digital data, the method comprising:
  (a) forming a first modulated beam by:
    (a1) providing a first color beam from a first light source;
    (a2) providing a second color beam from a second light source;
    (a3) in a repeated sequence, alternately directing said first and said second color beam to a first spatial light modulator as a first incident light beam, said first spatial light modulator modulating said first incident light beam as an array of pixels to form said first modulated beam;
  (b) forming a second modulated beam by:
    (b1) providing a third color beam from a third light source;
    (b2) providing a fourth color beam from a fourth light source;
    (b3) in a repeated sequence, alternately directing said third and said fourth color beam to a second spatial light modulator as a second incident light beam, said second spatial light modulator modulating said second incident light beam as an array of pixels to form said second modulated beam;
  (c) forming a third modulated beam by:
    (c1) providing a fifth color beam from a fifth light source;
    (c2) providing a sixth color beam from a sixth light source;
    (c3) in a repeated sequence, alternately directing said fifth and said sixth color beam to a third spatial light modulator as a third incident light beam, said third spatial light modulator modulating said third incident light beam as an array of pixels to form said third modulated beam; and
  (d) combining said first, second, and third modulated beams to form an output beam and projecting said output beam onto a surface in order to form the color image.

13. A method for displaying a color image according to claim 12 wherein the step of combining uses a dichroic prism.

14. A method for displaying a color image according to claim 12 wherein said first, second, and third modulated beams do not have the same resolution.

15. A method for displaying a color image from digital data, the method comprising:
  (a) forming a first modulated beam by modulating a first color beam at a first spatial light modulator;
  (b) forming a second modulated beam by modulating a second color beam at a second spatial light modulator;
  (c) forming a third modulated beam by modulating a third color beam at a third spatial light modulator;
  (d) forming a fourth modulated beam by modulating a fourth color beam at a fourth spatial light modulator;
  (e) forming a fifth modulated beam by modulating a fifth color beam at a fifth spatial light modulator;
  (f) forming a sixth modulated beam by modulating a sixth color beam at a sixth spatial light modulator;
  (g) combining said first, second, third, fourth, fifth, and sixth modulated beams to form a multicolor beam and projecting said multicolor beam onto a display surface; and
  wherein said first spatial light modulator differs in resolution from at least one of said second, third, fourth, fifth, and sixth spatial light modulators.

16. A method for minimizing flicker in a digital display system that modulates, in a display sequence, a first, a second, a third, a fourth, a fifth, and a sixth color respectively from a first, a second, a third, a fourth, a fifth, and a sixth color source, the method comprising the steps of:
  (a) arranging said first, second, third, fourth, fifth, and sixth colors in a luminance sequence in order of highest, second highest, third highest, fourth highest, fifth highest, and sixth highest relative luminance value;

(b) using said luminance sequence, grouping said first, second, third, fourth, fifth and sixth colors into first, second, and third pairs, such that each said pair contains one of said first, second, third, fourth, fifth, and sixth colors having highest, second highest, or third highest relative luminance value and one of said first, second, third, fourth, fifth, and sixth colors having fourth highest, fifth highest, or sixth highest relative luminance value; and (c) sequentially modulating said first, second, third, fourth, fifth, and sixth colors in sequence of said first, second, and third pairs, thereby smoothing the luminance transition between colors.

17. A method for minimizing flicker in a digital display system accordin to claim 16 further comprising the step of adjusting luminance for at least one of said first, second, third, fourth, fifth, and sixth colors by adjusting power to the corresponding at least one of said first, second, third, fourth, fifth, and sixth color source.

* * * * *